(12) United States Patent
Wright et al.

(10) Patent No.: US 8,268,044 B2
(45) Date of Patent: Sep. 18, 2012

(54) SEPARATION OF A SOUR SYNGAS STREAM

(75) Inventors: Andrew David Wright, Guildford (GB); Vincent White, Ashtead (GB); Kevin Boyle Fogash, Wescosville, PA (US); Jeffrey William Kloosterman, Allentown, PA (US); Jeffrey Raymond Hufton, Fogelsville, PA (US); Charles Linford Schaffer, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 164 days.

(21) Appl. No.: 12/835,112

(22) Filed: Jul. 13, 2010

(65) Prior Publication Data

US 2012/0012000 A1 Jan. 19, 2012

(51) Int. Cl.
*B01D 53/02* (2006.01)
(52) U.S. Cl. .............. 95/96; 95/104; 95/148; 96/130; 96/143
(58) Field of Classification Search .............. 95/96, 104, 95/148; 96/130, 143
See application file for complete search history.

(56) References Cited

U.S. PATENT DOCUMENTS

| | | | |
|---|---|---|---|
| 3,797,201 A | 3/1974 | Tamura | |
| 4,171,206 A | 10/1979 | Sircar | |
| 4,171,207 A | 10/1979 | Sircar | |
| 4,790,858 A | 12/1988 | Sircar | |
| 5,440,873 A * | 8/1995 | Toda et al. | 60/39.12 |
| 6,962,683 B2 | 11/2005 | Gangwal et al. | |
| 7,306,651 B2 | 12/2007 | Cieutat et al. | |
| 7,354,562 B2 | 4/2008 | Ying et al. | |
| 2006/0260189 A1 | 11/2006 | Reddy et al. | |
| 2007/0178035 A1 | 8/2007 | White et al. | |
| 2007/0232706 A1 | 10/2007 | Shah et al. | |
| 2008/0173584 A1 | 7/2008 | White et al. | |
| 2008/0173585 A1 | 7/2008 | White et al. | |
| 2010/0011955 A1 | 1/2010 | Hufton et al. | |

FOREIGN PATENT DOCUMENTS

EP 0444987 8/1993
EP 2 145 665 A2 1/2010

OTHER PUBLICATIONS

Shao et al; "Polymeric membranes for the hydrogen economy: Contemporary approaches and prospects for the future" Journal of Membrane Science 327 (2009) p. 18-31.
Elsayed et al; "Desulfurization of air at high and low H2S concentrations" Chemical Engineering Journal 155 (2009) p. 594-602.
Tian et al; "Enhanced removal of hydrogen sulfide from a gas stream by 3-aminopropyltriethoxysilane-surface-functionalized activated carbon" Adsorption 15 (2009); p. 477-488.
Klooserman et al; "Method of Treating a Gaseous Mixture Comprising Hydrogen, Carbon Dioxide and Hydrogen Sulphide" U.S. Appl. No. 12/835,063, filed Jul. 13, 2010.
Wright et al; "Method and Apparatus for Producing Power and Hydrogen" U.S. Appl. No. 12/835,084, filed Jul. 13, 2010.

* cited by examiner

*Primary Examiner* — Robert A Hopkins
(74) *Attorney, Agent, or Firm* — Willard Jones, II

(57) ABSTRACT

A feed stream, comprising hydrogen sulphide ($H_2S$), carbon dioxide ($CO_2$), hydrogen ($H_2$) and, optionally, carbon monoxide (CO), is separated into at least a $CO_2$ product stream and an $H_2$ or $H_2$ and CO product stream. The stream is separated using a pressure swing adsorption system, an $H_2S$ removal system and a further separation system, which systems are used in series to separate the stream. The method has particular application in the separation of a sour (i.e. sulphur containing) syngas, as for example produced from the gasification of solid or heavy liquid carbonaceous feedstock.

23 Claims, 4 Drawing Sheets

SEPARATION OF A SOUR SYNGAS STREAM

BACKGROUND OF THE INVENTION

The present invention relates to a method for separating a feed stream, comprising hydrogen sulphide ($H_2S$), carbon dioxide ($CO_2$), and one or both of hydrogen ($H_2$) and carbon monoxide (CO), into at least a $CO_2$ product stream and an $H_2$ or $H_2$ and CO product stream. The invention has particular application in the separation of a sour (i.e. sulphur containing) syngas, as for example may be obtained from the gasification of solid or liquid carbonaceous feedstock, to obtain: a $CO_2$ rich product stream suitable for geological storage; an $H_2$ or $H_2$ and CO product stream suitable for use in a chemicals plant or refinery, or as fuel for a gas turbine; and, optionally but preferably, an $H_2S$ enriched stream that can be further processed, e.g. in a Claus unit or other suitable sulphur recovery system, in order to convert to elemental sulphur the $H_2S$ contained therein.

It is well known that streams comprising $H_2$ and CO can be produced via gasification of solid or liquid feedstock. However, such processes result in a crude syngas stream containing, in addition to $H_2$ and CO, also $CO_2$ and $H_2S$. The $CO_2$ arises from the partial combustion of the feedstock during gasification, the concentration of which is increased if the crude syngas steam is subjected to a water-gas shift reaction to convert by reaction with $H_2O$ all or part of the CO in the stream to $CO_2$ and $H_2$. The $H_2S$ arises from the reduction of sulphur present in the feedstock during gasification, and from further conversion of other sulphur species in the crude syngas stream to $H_2S$ during the water-gas shift reaction.

Due to concerns over greenhouse gas emissions, there is a growing desire to remove $CO_2$ from syngas prior to its use (e.g. as a combustion fuel). The $CO_2$ may be compressed so as to be stored underground. $H_2S$ must also be removed from the syngas as it could be a poison for downstream processes, or if the syngas is combusted in a gas turbine then the $H_2S$ is converted into $SO_2$, which has limits on its emission and so would need to be removed using expensive desulphurization technology on the combustion exhaust gas.

After separating the $H_2S$ and $CO_2$ from the syngas, it may not be practical or permissible to store the $H_2S$ with the $CO_2$. Therefore a solution must also be found for cost effective removal of the $H_2S$ from the $CO_2$ before pipeline transportation.

The currently used commercial solution for this problem is to use a liquid absorption process (e.g. Selexol™, Rectisol® or other such acid gas removal process) that removes the $CO_2$ and $H_2S$ from the syngas. The $CO_2$ is obtained as a product gas of sufficient purity that it can be directly pressurized and piped to storage or enhanced oil recovery (EOR). The $H_2S$ is obtained as an $H_2S$ enriched mixture comprising 20-80 mole % $H_2S$, which mixture can then be sent to, for example, a Claus unit to produce elemental sulphur. However, such liquid adsorption processes are costly (both in terms of capital and operating cost) and have significant power consumption.

US-A1-2007/0178035 describes a method of treating a gaseous mixture comprising $H_2$, $CO_2$ and at least one combustible gas selected from the group consisting of $H_2S$, CO and $CH_4$. $H_2$ is separated from the gaseous mixture, preferably by a pressure swing adsorption (PSA) process, to produce a separated $H_2$ gas and a crude $CO_2$ gas comprising the combustible gas(es). The crude $CO_2$ gas is then combusted in the presence of $O_2$ to produce heat and a $CO_2$ product gas comprising combustion products of the combustible gas(es). The combustible gas may be $H_2S$, in which case the combustion products are $SO_2$ and $SO_3$ ($SO_X$) and $H_2O$. The $CO_2$ product gas can then be washed with water to cool the gas and convert $SO_3$ to sulfuric acid, and maintained at elevated pressure in the presence of $O_2$, water and $NO_x$ to convert $SO_2$ and $NO_x$ to sulfuric acid and nitric acid.

Thus, in the process described in US-A1-2007/0178035, $H_2S$ is removed by conversion to $SO_x$ and then $H_2SO_4$, and is not available for subsequent conversion to elemental sulphur in a Claus unit. Any $H_2$/CO present in the crude $CO_2$ gas is also combusted, and thus lost as potential product.

US-A1-2008/0173585 describes a method of purifying an impure $CO_2$ stream by partial condensation. The method comprises compressing impure $CO_2$ gas, condensing at least a portion of the compressed gas to produce impure $CO_2$ liquid; expanding at least a portion of said impure $CO_2$ liquid to produce expanded impure $CO_2$ liquid; and separating at least a portion of said expanded impure $CO_2$ liquid in a mass transfer separation column system to produce a contaminant-enriched overhead vapor and $CO_2$ bottoms liquid. In one embodiment, the impure $CO_2$ is obtained from waste gas from a hydrogen PSA process, the contaminants removed being $H_2$, CO, nitrogen, methane and argon. In the embodiment depicted in FIGS. 2 and 3 of the document, a temperature swing adsorption (TSA) unit is used to remove water from the impure $CO_2$ stream prior to the partial condensation process, so as to prevent water from freezing and blocking the heat exchanger.

US-A1-2008/0173584 describes a similar method to that described in US-A1-2008/0173585.

US-A1-2007/0232706 describes a method of producing a carbon dioxide product stream from a hydrogen plant. In one embodiment, a vacuum pressure swing adsorption (VPSA) unit is used to separate a crude $CO_2$ stream from at least part of a syngas stream from a steam-methane reformer. The crude $CO_2$ is compressed, passed through a temperature pressure swing adsorption (TPSA) unit to dry the stream, and partially condensed and distilled to obtain liquid $CO_2$ product stream, a $CO_2$ rich vapour, and a $CO_2$ depleted vapour, the latter being recycled to the VPSA unit.

Chemical Engineering Journal 155 (2009) 594-602, "Desulfurization of air at high and low $H_2S$ concentrations", describes the capability to separate $H_2S$ from air using adsorption on activated carbon. It also describes a potential advantage of the presence of water vapour in the feed stream in enhancing $H_2S$ uptake for at least one type of modified activated carbon.

Adsorption 15 (2009) 477-488, "Enhanced removal of hydrogen sulfide from a gas stream by 3-aminopropyltriethoxysilane-surface-functionalized activated carbon", describes the capability to separate $H_2S$ from Claus tail gas using adsorption on activated carbon. This document also suggests that for some carbon adsorbents, the presence of water in the feed stream may enhance the $H_2S$ capacity.

US-B2-7306651 describes the separation of a gas mixture comprising $H_2S$ and $H_2$ using the combination of a PSA unit with a membrane. The PSA separates the feed stream into a $H_2$ stream and two $H_2S$-rich streams. One $H_2S$-rich stream is recovered as product and the second is compressed and put through a membrane to remove the $H_2$. The $H_2S$ is then supplied to the PSA unit at pressure for rinsing and the $H_2$ returned to the PSA unit for purging.

EP-B1-0444987 describes the separation of $CO_2$ and $H_2S$ from a syngas stream produced by gasification of coal. The syngas stream, containing $H_2S$, is reacted with steam in a catalytic CO-shift reactor to convert essentially all the CO in the stream to $CO_2$. The stream is sent to a PSA unit that adsorbs $CO_2$ and $H_2S$ in preference to $H_2$, to separate the stream into an $H_2$ product gas and a stream containing $CO_2$ and $H_2S$. The stream containing $CO_2$ and $H_2S$ is sent to a second PSA unit that adsorbs $H_2S$ in preference to $CO_2$, to provide a $CO_2$ product, stated to be of high purity, and a $H_2S$ containing stream, which is sent to a Claus unit for conversion of the $H_2S$ into elemental sulphur.

There is a continuing need for new methods of separating sour syngas streams, and other streams comprising $H_2S$, $CO_2$, $H_2$ and optionally CO. In particular, there is a need for methods that can, preferably at lower cost and/or with lower power consumption than the current commercially used methods, separate such streams to obtain: an $H_2$ or $H_2$ and CO product of sufficient purity for refinery, chemicals or power applications; a $CO_2$ product of suitable purity for geological storage or EOR; and, preferably, a $H_2S$ containing product of suitable composition for further processing in a sulphur recovery system to convert the $H_2S$ to elemental sulphur.

BRIEF SUMMARY OF THE INVENTION

According to the present invention, there is provided a method and apparatus for separating a feed stream, comprising $H_2S$, $CO_2$, $H_2$ and optionally CO, into at least a $CO_2$ product stream and an $H_2$ or $H_2$ and CO product stream (referred to herein as the "$H_2$/CO product stream"), wherein the feed stream is separated using a pressure swing adsorption system (referred to herein as the "$H_2$/CO-PSA system"), an $H_2S$ removal system, and a further separation system, and wherein:

the feed stream is introduced into either the $H_2$/CO-PSA system or the $H_2S$ removal system;

the $H_2$/CO-PSA system either separates the feed stream to provide the $H_2$/CO product stream and a stream enriched in $CO_2$ and $H_2S$, or separates a stream already depleted in $H_2S$ by the $H_2S$ removal system to provide the $H_2$/CO product stream and a stream enriched in $CO_2$ and depleted in $H_2S$;

the $H_2S$ removal system either processes the feed stream to provide a stream depleted in $H_2S$, or processes a stream already enriched in $CO_2$ and $H_2S$ by the $H_2$/CO-PSA system to provide a stream enriched in $CO_2$ and depleted in $H_2S$, or processes a stream already enriched in $CO_2$ and $H_2S$ by the $H_2$/CO-PSA system and further enriched in $CO_2$ and $H_2S$ by the further separation system to provide the $CO_2$ product stream; and the further separation system either separates a stream already enriched in $CO_2$ and $H_2S$ by the $H_2$/CO-PSA system to provide a stream further enriched in $CO_2$ and $H_2S$ and a stream comprising $H_2$ or $H_2$ and CO, or separates a stream already enriched in $CO_2$ by the $H_2$/CO-PSA system and depleted in $H_2S$ by the $H_2S$ removal system to provide the $CO_2$ product stream and a stream comprising $H_2$ or $H_2$ and CO.

DETAILED DESCRIPTION OF THE INVENTION

Figure 1:
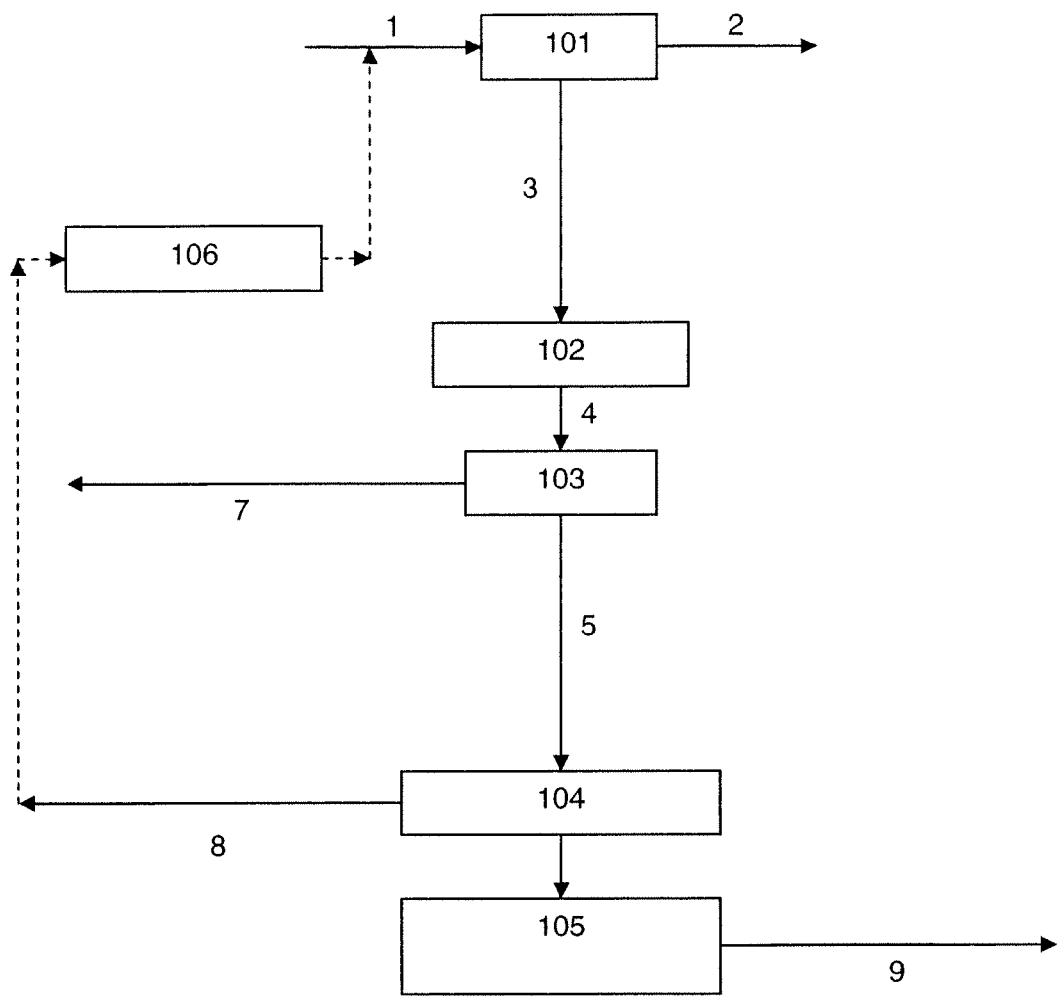
FIG. 1 is a flow sheet depicting an embodiment of the present invention.

The method of the present invention comprises separating a feed stream, comprising $H_2S$, $CO_2$, $H_2$ and optionally CO, into at least a $CO_2$ product stream and an $H_2$/CO product stream, using an $H_2$/CO-PSA system, an $H_2S$ removal system and a further separation system. These three systems are used in series to separate the feed stream, such that the feed stream is first separated/processed in one of said systems (more specifically, in either the $H_2$/CO-PSA system or the $H_2S$ removal system), a separated/processed portion of the feed obtained from said first one of said systems is sent to a second one of said systems, and a further separated/processed portion of the feed obtained from said second one of said systems is sent to the final one of said systems.

The $H_2$/CO-PSA system either separates the feed stream to provide the $H_2$/CO product stream and a stream enriched in $CO_2$ and $H_2S$, or separates a stream already depleted in $H_2S$ by the $H_2S$ removal system to provide the $H_2$/CO product stream and a stream enriched in $CO_2$ and depleted in $H_2S$. The $H_2$/CO-PSA system therefore either receives the feed stream, or is located downstream of the $H_2S$ removal system.

The $H_2S$ removal system either processes the feed stream to provide a stream depleted in $H_2S$, or processes a stream already enriched in $CO_2$ and $H_2S$ by the $H_2$/CO-PSA system to provide a stream enriched in $CO_2$ and depleted in $H_2S$, or processes a stream already enriched in $CO_2$ and $H_2S$ by the $H_2$/CO-PSA system and further enriched in $CO_2$ and $H_2S$ by the further separation system to provide the $CO_2$ product stream. The $H_2S$ removal system may therefore receive the feed stream, or may be located downstream of either or both of the $H_2$/CO-PSA system and the $CO_2$ separation system. Preferably, the $H_2S$ removal system separates the feed stream, or said stream already enriched in $CO_2$ and $H_2S$ by the $H_2$/CO-PSA system, or said stream already enriched in $CO_2$ and $H_2S$ by the $H_2$/CO-PSA system and further enriched in $CO_2$ and $H_2S$ by the further separation system, to provide an $H_2S$ enriched stream in addition to providing said stream depleted in $H_2S$, said stream enriched in $CO_2$ and depleted in $H_2S$, or said $CO_2$ product stream. In particular, the $H_2S$ removal system is preferably another pressure swing adsorption system (referred to herein as the "sour-PSA system"). If desired, one or more $H_2S$ containing streams, such as the tail-gas from a Claus unit and/or the off-gas from a sour water stripper, could be combined with or concurrently introduced alongside the stream fed into and processed by the $H_2S$ removal system.

The further separation system either separates a stream already enriched in $CO_2$ and $H_2S$ by the $H_2$/CO-PSA system to provide a stream further enriched in $CO_2$ and $H_2S$ and a stream comprising $H_2$ or $H_2$ and CO, or separates a stream already enriched in $CO_2$ by the $H_2$/CO-PSA system and depleted in $H_2S$ by the $H_2S$ removal system to provide the $CO_2$ product stream and a stream comprising $H_2$ or $H_2$ and CO. Thus, the further separation system is always positioned downstream of the $H_2$/CO-PSA system, and may be upstream or downstream of the $H_2S$ removal system. The further separation system is positioned downstream of the $H_2$/CO-PSA system so that it receives a stream that has already been enriched in $CO_2$ or $CO_2$ and $H_2S$ by the $H_2$/CO-PSA system (bulk separation of at least $CO_2$ from $H_2$ or $H_2$ and CO therefore taking place in the $H_2$/CO-PSA system). This, in turn, improves the level of separation of $CO_2$ or $CO_2$ and $H_2S$ from $H_2$ or $H_2$ and CO achievable within the separation system. The further separation system may, for example, be a partial condensation system or a membrane separation system.

The methods according to the present invention provide an alternative to the current commercially used methods for separating sour syngas and similar $H_2S$ containing streams, whereby the sour syngas or other such feed is separated into separate $H_2S$, $CO_2$ and $H_2$ streams by a liquid absorption process, such as for example Selexol™ or Rectisol®, only.

In the context of the method and apparatus of the present invention, and unless otherwise indicated, all references herein to a stream being enriched or depleted in a component refer to said stream being enriched or depleted in said component relative to the feed stream (i.e., where a stream is enriched in a component the concentration (mole percentage) of that component in said stream is greater than the concentration of that component in the feed stream, and where a stream is depleted in a component the concentration of that component in said stream is less than the concentration of that component in the feed stream).

The feed stream (also referred to hereinafter as the "process feed") comprises at least $H_2S$, $CO_2$, and $H_2$, and typically further comprises at least some CO. It is, preferably, formed from a syngas stream obtained from gasification of solid (e.g. coal, petcoke, biomass, municipal waste) or liquid (in particular a heavy liquid, e.g. asphaltenes) carbonaceous feedstock. The feed stream may be a syngas stream that has been further treated to remove particulates and/or alter the ratio of $H_2$ to CO, by techniques known in the art. For example, a water wash step will typically have been employed to remove the majority of particulates, and a water-gas shift reaction may have be used to convert some, most or all of the CO present in the crude syngas to H and $CO_2$. Other impurities may be present, such as $CH_4$, $N_2$ and/or Ar which will usually be separated alongside the $H_2$. Other sulphur containing components (e.g. COS) may also be present in the feed stream, in which case these components preferably are removed/separated alongside $H_2S$ such that, preferably, any streams depleted in $H_2S$ are depleted in said other sulphur containing components also. Water may be present in the feed stream, or a dry feed stream may be used (which may have been dried using techniques known in the art).

The feed stream preferably comprises: from about 500 ppm (0.05 mole %) to about 5 mole %, more preferably from about 2000 ppm (0.2 mole %) to about 2 mole % $H_2S$ (or $H_2S$ and any other sulphur containing components); from about 10 to about 60 mole %, more preferably from about 35 to about 55 mole % $CO_2$; and from about 35 mole % to the remainder (i.e. 100 mole % less the mole % of $H_2S$ and $CO_2$) of $H_2$ or a mixture of $H_2$ and CO, more preferably from about 40 mole % to the remainder of $H_2$ or a mixture of $H_2$ and CO.

Prior to introduction into the $H_2$/CO-PSA system or $H_2S$ removal system, the feed stream may be cooled by indirect heat exchange with, for example, a stream from said $H_2$/CO-PSA system and/or a stream from said $H_2S$ removal system that is at a lower temperature than the feed stream. Examples of such streams (i.e. streams of lower temperature available from the $H_2$/CO-PSA system or $H_2S$ removal system) may include the $CO_2$ or $CO_2$ and $H_2S$ enriched stream from the $H_2$/CO-PSA system and/or the $H_2S$ enriched stream (where such a stream is produced) from the $H_2S$ removal system. Where the $CO_2$ or $CO_2$ and $H_2S$ enriched stream from the $H_2$/CO-PSA system is so used, such heat exchange would normally take place prior to any compression of said stream. The cooling can remove water from the feed stream and if fed to the $H_2$/CO-PSA system, or to an $H_2S$ removal system that employs an adsorbent, may increase adsorption capacity in the system into which the feed stream is introduced.

The $H_2$/CO-PSA system may comprise a plurality of adsorbent beds, as is known in the art. For example, the system may comprise a plurality of beds, with the PSA cycles of the individual beds being appropriately staggered so that at any point in time there is always at least one bed undergoing adsorption and at least one bed undergoing regeneration, such that the system can continuously separate the stream fed to it. The system could also, for example, alternatively or additionally comprise more than one bed arranged in series and undergoing adsorption at the same time, the gas passing through one bed being passed to the next bed in the series, and with gases desorbed from the beds during regeneration being appropriately combined.

The $H_2$/CO-PSA system comprises adsorbent selective for at least $CO_2$ over at least $H_2$ (i.e. that adsorbs at least $CO_2$ preferentially to at least $H_2$, or, to put it another way, that adsorbs at least $CO_2$ with greater affinity than at least $H_2$). Where the feed stream is fed to the $H_2$/CO-PSA system, such that the $H_2$/CO-PSA system is to provide a stream enriched in $CO_2$ and $H_2S$, then the $H_2$/CO-PSA system comprises adsorbent selective for at least $CO_2$ and $H_2S$ (and, preferably, any other sulphur containing components present in the feed) over at least $H_2$. Where a stream already depleted in $H_2S$ by the $H_2S$ removal system is fed to the $H_2$/CO-PSA system then the $H_2$/CO-PSA system may not require adsorbent selective also for $H_2S$ (and any other sulphur containing components), although such adsorbent may still be employed, if desired. Where the feed stream also contains CO then the $H_2$/CO-PSA system may comprise adsorbent selective for at least $CO_2$ over both $H_2$ and CO, or the system may comprise adsorbent selective for at least $CO_2$ and CO over $H_2$, depending on whether the $H_2$/CO product stream is, respectively, to be enriched in both $H_2$ and CO or in $H_2$ only. It is generally preferred, however, that where the feed stream contains also CO then the $H_2$/CO-PSA system comprises adsorbent selective for at least $CO_2$ over both $H_2$ and CO so that the $H_2$/CO product stream is enriched in both $H_2$ and CO. This is particularly the case where the feed stream contains more than minor amounts of CO. Thus, it is preferred that the $H_2$/CO-PSA system comprises adsorbent selective for both CO and $CO_2$ over $H_2$, so that the is $H_2$/CO product stream is enriched in $H_2$ but not CO, only where the feed stream contains a CO concentration of at most about 5 mole %, more preferably of at most about 2 mole %, and most preferably of at most about 1 mole %.

The $H_2$/CO-PSA system may comprise a single type of adsorbent, selective for all the components that are to be selectively adsorbed by said system, or more than one type of adsorbent that in combination provide the desired selective adsorption. Where more than one type of adsorbent is present, these may be intermixed and/or arranged in separate layers/zones of a bed, or present in separate beds arranged in series, or arranged in any other manner as appropriate and known in the art. Exemplary adsorbents include carbons, aluminas, silica gels and molecular sieves. Where the $H_2$/CO-PSA system is to selectively adsorb $H_2S$ (in addition to at least $CO_2$), the preference is to use a single layer of silica gel if the $H_2$/CO product requirement is a $H_2$ and CO mixture, a single layer of silica gel or a silica gel/carbon split if the $H_2$/CO product requirement is gas turbine grade $H_2$, and a silica gel/carbon/5A zeolite split if the $H_2$/CO product requirement is high purity $H_2$. A suitable type of silica gel for use as an adsorbent is, for example, the high purity silica gel (greater than 99% $SiO_2$) described in US-A1-2010/0011955, the disclosure of which is incorporated herein by reference. Where the $H_2$/CO-PSA system does not need to selectively adsorb $H_2S$ (because this has already been removed by the $H_2S$ removal system) then zeolite or activated carbon based adsorbents may be preferable.

The $H_2$/CO-PSA system may, for example, be operated in the same way as known PSA systems for separating $H_2$ from a feed stream, with all known cycle options appropriate to this technology area (e.g. cycle and step timings; use, order and operation of adsorption, equalization, repressurisation, depressurisation and purge steps; and so forth). The PSA cycle employed will, of course, typically include at least an adsorption step and blowdown/depressurisation and purge steps. During the adsorption step the stream to be separated is fed at super-atmospheric pressure to the bed(s) undergoing the adsorption step and $CO_2$ and any other components that are to be selectively adsorbed, e.g. $H_2S$ and/or CO, are selectively adsorbed from the stream, the gas pushed through the bed(s) during this step forming all or at least a portion of the $H_2$/CO product stream withdrawn from the $H_2$/CO-PSA system. During the blowdown/depressurisation step(s) and purge step the pressure in the bed(s) is reduced, and a purge gas passed through the bed(s), to desorb $CO_2$ and any other components adsorbed during the previous adsorption step, thereby providing gas enriched in $CO_2$ and any other selectively adsorbed components, at least a portion of which forms at least a portion of the stream enriched in $CO_2$ or $CO_2$ and $H_2S$ withdrawn from the $H_2$/CO-PSA system, and regenerating the bed(s) in preparation for the next adsorption step.

The adsorption step may, for example, be carried out at a pressure of about 1-10 MPa (10-100 bar) absolute and at a temperature in the range of about 10-60° C. In this case, the $H_2$/CO product stream will, therefore, be obtained at about this pressure and temperature. The $CO_2$ or $CO_2$ and $H_2S$ enriched stream would typically all be obtained at about atmospheric pressure or at pressures slightly above atmospheric, i.e. at about or slightly above 0.1 MPa, but could be obtained at anything up to about 0.5 MPa (5 bar) absolute, for example.

The $H_2$/CO-PSA system may employ a PSA cycle that includes a rinse step in which the bed(s) undergoing the rinse step are rinsed with gas obtained from one or more other beds of the PSA system during the blowdown and/or purge steps, so that the $CO_2$ or $CO_2$ and $H_2S$ enriched stream produced by the system contains an increased concentration of $CO_2$ and any other components (e.g. $H_2S$) more strongly adsorbed by the system, and a reduced concentration of $H_2$ and any other components less strongly adsorbed by the system. Methods of employing a rinse step in a PSA cycle to increase the concentration of the more adsorbable component(s) in a desorbed gas stream from a PSA system are, for example, described in U.S. Pat. No. 3,797,201, U.S. Pat. No. 4,171,206 and/or U.S. Pat. No. 4,171,207, the disclosures of which are incorporated herein by reference.

If desired, the $H_2$/CO-PSA system may be a vacuum pressure swing adsorption (VPSA) system, in which the blowdown/depressurization step and purge step of the PSA cycle are conducted down to and at (respectively) sub-atmospheric pressure, for example down to about 0.01 MPa (0.1 bar) absolute. The VPSA system could, for example, be operated as described in US-A1-2007/0232706, the disclosure of which is incorporated herein by reference. Use of a VPSA system instead of a conventional PSA system may improve the performance of the system, but it would also add cost and would introduce the possibility of $O_2$ contamination resulting from air ingress.

Where the process feed contains CO and is to be introduced into the $H_2$/CO-PSA system, the $H_2$/CO-PSA system may also effect a SEWGS (sorption-enhanced water gas shift) reaction as, for example, described in US-B2-7354562, the disclosure of which is incorporated herein by reference. In this process the PSA system effects a water-gas shift reaction at the same time as adsorbing $CO_2$, $CO_2$ produced by shift reaction being adsorbed (alongside existing $CO_2$ in the feed) as it is produced, thereby driving the conversion of further CO in the feed into additional $CO_2$ and $H_2$. This process may be carried out at 200° C.-500° C. feed temperature, using an adsorbent such as hydrotalcite or double salts (as described in US-B2-7354562). The $CO_2$ or $CO_2$ and $H_2S$ enriched stream produced by the system would typically then be cooled prior to any compression thereof.

Where the $H_2$/CO-PSA system is a SEWGS system, the hot $CO_2$ or $CO_2$ and $H_2S$ enriched stream could also be expanded to sub atmospheric pressure. Then any steam in the stream could then be condensed out and removed, prior to the stream being recompressed. The expansion step could provide power for the compression step (for example by having the expander and compressor on the same drive shaft).

The $H_2$/CO product stream is (as noted above) obtained from the $H_2$/CO-PSA system and is enriched in $H_2$ relative to the feed stream. Where the feed stream contains also CO, the $H_2$/CO product stream will typically contain also some CO and (as also noted above) in general, and in particular where the feed stream contains more than minor amounts of CO, will preferably also be enriched in CO relative to the feed stream. The $H_2$/CO product stream is depleted in both $CO_2$ and $H_2S$.

Preferably, at least about 80%, more preferably at least about 85%, and more preferably at least about 95% of the $H_2$ present in the feed stream is recovered in the $H_2$/CO product stream. Where the feed stream contains also CO and the $H_2$/CO product stream is also enriched in CO then, preferably, at least about 75%, more preferably at least about 80%, and most preferably at least about 90% of the $H_2$ and CO (in combination) present in the feed stream is recovered the $H_2$/CO product stream. Preferably at most about 25%, and more preferably at most about 15% of the $CO_2$ present in the feed stream is recovered the $H_2$/CO product stream, and most preferably no or substantially no $CO_2$ is recovered in $H_2$/CO product stream (i.e. the $H_2$/CO product stream is free or substantially free of $CO_2$). The percentage recovery in the $H_2$/CO product stream of a component or combination of components can be calculated from the moles of the component or components in question in the feed and $H_2$/CO product streams. Thus, if for example the feed were to comprise 50 kmol/hr of $CO_2$, 25 kmol/hr of $H_2$ and 25 kmol/hr of CO; and the $H_2$/CO product stream were to contain 5 kmol/hr of $CO_2$, 23 kmol/hr of $H_2$ and 20 kmol/hr of CO; then in this case 10% of the $CO_2$, 92% of the $H_2$ and 86% of the $H_2$ and CO present in the feed stream would be recovered in the $H_2$/CO product stream.

Preferably, the $H_2$/CO product stream contains at most about 50 ppm and more preferably at most about 10 ppm $H_2S$ (or $H_2S$ and any other sulphur containing components), and most preferably is free of $H_2S$ (and any other sulphur containing components). The $H_2$/CO product stream may, as noted above, still contain impurities such as $CH_4$, $N_2$ and/or Ar. Alternatively, the $H_2$/CO product stream may be a substantially pure or pure stream of $H_2$ or $H_2$ and CO.

The $H_2$/CO product stream may for example be a $H_2$-rich gas of sufficient purity to be sent to a gas turbine as fuel, or a $H_2$ product of sufficient purity for refinery and chemicals applications.

Alternatively, and in particular where the feed stream contains CO in more than minor amounts, the $H_2$/CO product may for example be mixture of $H_2$ and CO having a specific ratio of $H_2$ and CO desired for use as feed to a chemicals plant, such as a Fisher-Tropsch plant or methanol plant.

Prior to such uses of the $H_2$/CO product stream, the stream may also be heated and expanded to make power.

If the $H_2$/CO product stream comprises a mixture of $H_2$ and CO then a further potential use of the stream may be to send the product stream to a partial condensation system to further split the stream into a number of fractions of different composition.

As noted above, the $H_2$/CO-PSA system also provides a stream enriched in $CO_2$. Where this stream is obtained from the $H_2$/CO-PSA system separating the feed stream then this stream is also enriched in $H_2S$, and where this stream is obtained from the $H_2$/CO-PSA system separating a stream already depleted in $H_2S$ by the $H_2S$ removal system then this stream is likewise depleted in $H_2S$. Due to complete separation of all $H_2$ and/or CO from all $CO_2$ by the $H_2$/CO-PSA system not being economically viable, the $CO_2$ enriched stream produced by the $H_2$/CO-PSA system will also contain a certain amount of $H_2$ and (if also present in the feed stream) CO. Preferably, the $CO_2$ enriched stream produced by the $H_2$/CO-PSA system has a $CO_2$ concentration of at least about 60 mole %, more preferably at least about 70 mole %, more preferably at least about 80 mole %. Where the $CO_2$ enriched stream is depleted in $H_2S$, the $H_2S$ concentration (or concentration of $H_2S$ and any other sulphur containing components) of the stream is preferably about 100 ppm or less, more preferably about 50 ppm or less, more preferably about 20 ppm or less, and most preferably the stream is free of $H_2S$ (and any other sulphur containing components). Where the $CO_2$ enriched stream is enriched in $H_2S$ then preferably all or substantially all of the $H_2S$, and preferably all or substantially all of any other sulphur containing components, present in the feed stream is recovered in this $CO_2$ enriched stream.

The $CO_2$ enriched (and $H_2S$ enriched or depleted) stream obtained from the $H_2$/CO-PSA system will typically need to be compressed. In particular, compression is likely to be necessary if the stream is to be next processed in the $H_2S$ removal system, and may likewise be necessary where the stream is to be next separated in the further separation system (such as where said further separation system is a partial condensation or membrane separation system). Multi-stage compression with intercooling and water knock-out may be used. The $CO_2$ or $CO_2$ and $H_2S$ enriched stream could be composed of more than one stream removed from the $H_2$/CO-PSA system at different pressure levels. In this case, the different pressure streams could be put into the compressor at the appropriate compression stage to minimise the overall compression power.

The $H_2S$ removal system may be of any type suitable for processing the feed stream, a stream already enriched in $CO_2$ and $H_2S$ by the $H_2$/CO-PSA system, or a stream already further enriched in $CO_2$ and $H_2S$ by the further separation system, to remove $H_2S$ (and, preferably, any other sulphur containing components) therefrom and provide, respectively, a stream depleted in $H_2S$, a stream enriched in $CO_2$ and depleted in $H_2S$ relative to the feed stream, or the $CO_2$ product stream.

A relatively simple $H_2S$ removal system that could be used would be a disposable adsorbent system (e.g. a packed bed of ZnO) that would be disposed of and replaced when saturated with $H_2S$ (although, from an economics standpoint, such a system would preferably only be adopted when the concentration of $H_2S$ in the feed stream is relatively low, e.g. less than about 200 ppm). Alternatively, an absorption based system (e.g. Selexol™ or Rectisol®) could be used as the $H_2S$ removal system (use of such a system as the system for removing $H_2S$ still providing capital and operating cost benefits, due to reduced unit size and associated power consumption, over the use of such a system to effect also bulk separation of $CO_2$ from $H_2$ or $H_2$ and CO, as typically done in current commercially used methods for separating sour syngas). Another option would be to use as the $H_2S$ removal system a system that directly converts to and removes as sulphur the $H_2S$ in the stream received by the $H_2S$ removal system, such a system being for example as described in U.S. Pat. No. 6,962,683, the disclosure of which is incorporated herein by reference.

In preferred embodiments, however, the $H_2S$ removal system is a sour-PSA system, which processes the feed stream, stream already enriched in $CO_2$ and $H_2S$ by the $H_2$/CO-PSA system, or stream already further enriched in $CO_2$ and $H_2S$ by the further separation system, to remove $H_2S$ (and, preferably, any other sulphur containing components) therefrom by separating said stream to provide a stream enriched in $H_2S$ in addition to providing said stream depleted in $H_2S$, said stream enriched in $CO_2$ and depleted in $H_2S$, or said $CO_2$ product stream.

Like the $H_2$/CO-PSA system, the sour-PSA system may comprise a plurality of adsorbent beds, and/or may comprise a single type of adsorbent, selective for all the components that are to be selectively adsorbed by said system, or more than one type of adsorbent that in combination provide the desired selective adsorption. The sour-PSA system contains adsorbent selective for $H_2S$ (and, preferably, any other sulphur components, such as COS, that may be present in the stream separated by the sour-PSA system) over $CO_2$ and, if present in the stream to be separated by the sour-PSA system, $H_2$ and CO. Exemplary adsorbents include silica gels, activated carbons, and molecular sieves. A preferred option is to use a surface modified or impregnated activated carbon, which maximizes the $H_2S/CO_2$ selectivity of the system. Another option is to include adsorbent, such as an additional layer of silica gel, alumina or molecular sieve (e.g. 4A or 5A), selective for water and other condensables over $CO_2$ and (if present) $H_2$ and CO, so that if water and other condensables are present in the stream fed to the sour-PSA system then these components are also selectively adsorbed, with the result that the $H_2S$ depleted/$CO_2$ enriched and $H_2S$ depleted/$CO_2$ product stream obtained from the sour-PSA system is in addition depleted in water.

During the $H_2S$ removal process, sulphur species including elemental sulphur may form on the adsorbent. Sulphur is known to be capable of removing mercury species from a gas and mercury may be present in the stream introduced into the sour-PSA system, in particular where the process feed has been generated from gasification of a fossil fuel. Where the process feed contains mercury and the further separation system is, for example, a partial condensation system, removal of mercury upstream of the partial condensation system may be necessary (for example where, as is typical, the $CO_2$ partial condensation system uses a heat exchanger that is made of aluminium, which is prone to corrosion by mercury). Thus, a further benefit of the use of a sour-PSA system upstream of the partial condensation system in such an arrangement could be the elimination of the need for a separate sulphur impregnated carbon bed for mercury removal.

Like the $H_2$/CO-PSA system, the sour-PSA system may, for example, be operated in the same way as known PSA systems for separating $H_2$ from a feed stream, with all known cycle options appropriate to this technology area (e.g. cycle and step timings; use, order and operation of adsorption, equalization, repressurisation, depressurisation, and purge steps; and so forth). The PSA cycle employed will, of course, typically include at least an adsorption step and blowdown/depressurisation steps. During the adsorption step the stream to be separated is fed at super-atmospheric pressure to the bed(s) undergoing the adsorption step and $H_2S$ (and any other components to be selectively adsorbed) are selectively adsorbed from the stream, the gas pushed out through the bed(s) during this step forming all or at least a portion of the $H_2S$ depleted/$CO_2$ enriched and $H_2S$ depleted/$CO_2$ product stream obtained from the sour-PSA system. During the blowdown/depressurisation step(s) and purge step the pressure in the bed(s) is reduced, and a purge gas passed through the bed(s), to desorb $H_2S$ and any other components adsorbed during the previous adsorption step, thereby providing gas enriched in $H_2S$ (and any other selectively adsorbed components), at least a portion of which forms at least a portion of the $H_2S$ enriched stream obtained from the sour-PSA system, and regenerating the bed(s) in preparation for the next adsorption step.

Alternatively, where the stream to be separated by the sour-PSA system is in the liquid phase, as may be the case where the further separation system is a partial condensation system (as will be described in further detail below) and the sour-PSA system separates a stream already further enriched in $CO_2$ and $H_2S$ by said partial condensation system to provide the $CO_2$ product stream and a stream enriched in $H_2S$, then the sour-PSA system may be operated in the same way as known PSA systems for separating a liquid stream, with all known cycle options appropriate to this technology area. In such circumstances, the PSA cycle employed may, for example, comprise: (a) an adsorption step where the liquid to be separated is fed to the bed(s) undergoing the adsorption step and $H_2S$ (and any other components to be selectively adsorbed) are selectively adsorbed therefrom, the liquid withdrawn from the bed(s) forming all or at least a portion of the $CO_2$ product stream; (b) a step where liquid is drained from the bed(s) while supplying a gas (e.g. comprising $CO_2$ or $CO_2$ and $H_2S$) to maintain the pressure inside the bed(s); (c) blowdown/depressurisation step(s) and a purge step where the pressure in the bed(s) is reduced, and a purge gas passed through the bed(s), to desorb $H_2S$ and any other components adsorbed during the previous adsorption step, thereby providing gas enriched in $H_2S$ (and any other selectively adsorbed components) at least a portion of which forms at least a portion of the $H_2S$ enriched stream obtained from the sour-PSA system; and (d) a step where the bed(s) are refilled with liquid (e.g. using a portion of the liquid withdrawn during the adsorption step and/or using the liquid to be separated) thereby pushing out residual gas prior to the next adsorption step.

In either case, the purge gas used during the purge step may, for example, and as is known in the art, be obtained from the bed(s) of the sour-PSA system during a different step of the PSA cycle (for example, a portion of the gas pushed through the beds during the adsorption step may be used as purge gas). Alternatively or additionally, the purge gas may be obtained from external sources.

For example, steam could be used as a purge gas (either on its own or in addition with other purge gases) for purging the sour-PSA (which may improve removal of $H_2S$). The purged gas may then be cooled, and water condensed out, which would increase the $H_2S$ purity of the purge gas. Options for drying the adsorbent bed after purging with steam include: (i) using all or part of the stream comprising $H_2$ or $H_2$ and CO obtained from the further separation system; or (ii) using $N_2$ from an air separation unit (ASU) and venting the gas.

Equally, some or all of the stream comprising $H_2$ or $H_2$ and CO obtained from the further separation system could be used as a purge gas (either on its own or in addition with other purge gases) for purging the sour-PSA. The use of this stream as a purge gas will increase the concentration of $H_2$ or $H_2$ and CO in the stream enriched in $H_2S$ obtained from the sour-PSA system (assuming gas obtained during the purge step forms at least a portion of said stream). This may, however, be of benefit where the $H_2S$ enriched stream is to be sent to a Claus unit or other such system that converts $H_2S$ to elemental sulphur via a process that includes an initial combustion step (the increase in the concentration of $H_2$ or $H_2$ and CO reducing the concentration of $H_2S$ required for optimal combustion of the mixture in this initial step combustion step).

The purge gas used during the purge step (whether obtained from the bed(s) of sour-PSA or from an external source) may be pre-heated, either in part or in full, before it is used for purging the bed(s) of the sour-PSA. The pre-heating may be carried out in an external heater or heat exchanger, using for example an electric heating element, steam, or heat from combustion (e.g. from combustion of all or a portion of the $H_2$/CO product stream or from combustion of all or a portion of the stream comprising $H_2$ or $H_2$ and CO obtained from the further separation system). If this approach is chosen then the temperature of the purge gas could for example be raised up to about 300° C., preferably in the range of about 150° C. to about 300° C.

Where the sour-PSA system separates the feed stream, and thus is used upstream of the $H_2$/CO-PSA system, the adsorption step used in the sour-PSA system may, for example, be carried out within similar pressure and temperature ranges (i.e. about 1-10 MPa and about 10-60° C.) to those used for the adsorption step in the $H_2$/CO-PSA system. Where the sour-PSA system is used downstream of the $H_2$/CO-PSA system then a somewhat lower pressure range for the adsorption step in the sour-PSA system may be preferable. The adsorption may, for example, in the latter case be carried out at a pressure of 0.5 to 4 MPa (5-40 bar) absolute, more typically at about 3 MPa (30 bar) absolute, and at temperatures of about 10-60° C. The $H_2S$ depleted/$CO_2$ enriched and $H_2S$ depleted/$CO_2$ product stream obtained from the sour-PSA system will, therefore, be obtained at about these pressures and temperatures. The $H_2S$ enriched stream would typically be obtained at about atmospheric pressure, i.e. 0.1 MPa absolute.

Like the $H_2$/CO-PSA system, the sour-PSA system may be a vacuum pressure swing adsorption (VPSA) system, in which the blowdown/depressurization step and purge step of the PSA cycle are conducted at sub-atmospheric pressure. The $H_2S$ enriched stream, which would then be produced at sub-atmospheric pressure, would typically then need to be compressed prior to being sent to a Claus unit or other unit for converting the $H_2S$ to elemental sulphur.

The sour-PSA system may employ a PSA cycle that includes a rinse step in which the bed(s) undergoing the rinse step are rinsed, for example with gas obtained from one or more other beds of the PSA system during the blowdown and/or purge steps, so that the $H_2S$ enriched stream produced by the system contains an increased concentration of $H_2S$ (and any other sulphur containing components selectively adsorbed by the system). As noted above, exemplary methods of employing a rinse step in a PSA cycle to increase the concentration of the more adsorbable component in a desorbed gas stream are described in U.S. Pat. No. 3,797,201, U.S. Pat. No. 4,171,206 and/or U.S. Pat. No. 4,171,207, the contents of which, as noted above, are incorporated herein by reference. The gas obtained from said one or more other beds undergoing blowdown/purge must be compressed before it is used for rinsing, and after compression the gas may be cooled and any water present condensed and separated out prior to the gas being used for rinsing.

The rinse gas (i.e., the gas obtained from said one or more other beds undergoing blowdown/purge that is used in the rinse step) may be compressed to the same pressure as that during the adsorption step, with the rinse step being carried out on a bed after and at the same pressure as the adsorption step. In this case, the composition of the unadsorbed gas pushed out the bed(s) during the rinse step may be suitable for combination with the gas pushed out during the adsorption step, in which case both gases may be used to form the $H_2S$ depleted/$CO_2$ enriched and $H_2S$ depleted/$CO_2$ product stream produced by the sour-PSA system. Alternatively, the rinse gas may be compressed to the pressure after a final equalization step of the PSA cycle, and supplied after this final equalization step. The rinse gas could also be compressed to and supplied at any intermediate pressure. The unadsorbed gas pushed out the bed(s) during the rinse step may also: be fed into another bed of the PSA system just after its purge step, recovering the pressure energy of this gas; be used to purge another bed in the PSA system; or be combined with the feed to another bed undergoing the adsorption step.

The rinse step may comprise using as a rinse gas a portion of the gases obtained from both the blowdown and purge steps of the sour-PSA system (the remainder of said gases being, for example, withdrawn to form said $H_2S$ enriched stream). Alternatively, all or a portion of gas from only blowdown or purge steps could be used. For example, in a similar manner to that described in U.S. Pat. No. 7,306,651, the disclosure of which is incorporated herein by reference, the rinse gas could be obtained from the purge step of the PSA cycle, and the $H_2S$ enriched stream obtained from the blowdown step of the PSA cycle. Alternatively, the $H_2S$ enriched stream could be obtained during the purge step, and rinse gas obtained from the blowdown step.

As noted above, where the $H_2S$ removal system processes the feed stream it provides a stream depleted in $H_2S$. Preferably, the $H_2S$ concentration (or concentration of $H_2S$ and any other sulphur containing components) in said $H_2S$ depleted stream is about 100 ppm or less, more preferably about 20 ppm or less, more preferably about 5 ppm or less, and most preferably the stream is free of $H_2S$ (and any other sulphur containing components). Where the $H_2S$ removal system processes a stream already enriched in $CO_2$ and $H_2S$ by the $H_2$/CO-PSA system, the $H_2S$ removal system provides a stream enriched in $CO_2$ and depleted in $H_2S$. Preferably, said $CO_2$ enriched and $H_2S$ depleted stream has a $CO_2$ concentration of at least about 60 mole %, more preferably at least about 70 mole %, more preferably at least about 80 mole %. Preferably, said $CO_2$ enriched and $H_2S$ depleted stream has an $H_2S$ concentration (or concentration of $H_2S$ and any other sulphur containing components) of about 100 ppm or less, more preferably about 50 ppm or less, more preferably about 20 ppm or less, and most preferably the stream is free of $H_2S$ (and any other sulphur containing components).

The $H_2S$ enriched stream, where this also is produced by the $H_2S$ removal system (such as where the $H_2S$ removal system is a sour-PSA system), typically has an $H_2S$ concentration of at least 4 mole %. Preferably, the $H_2S$ enriched steam is sent or is to be sent to a Claus unit or another type of sulphur recovery unit (e.g. LO-CAT®, Selectox) for conversion of the $H_2S$ into elemental sulphur, and therefore has a $H_2S$ concentration, such as from about 20 to about 80 mole %, that is suitable for such a reaction.

The further separation system, as noted above, separates either a stream already enriched in $CO_2$ and $H_2S$ by the $H_2$/CO-PSA system to provide a stream further enriched in $CO_2$ and $H_2S$ and a stream comprising $H_2$ or $H_2$ and CO, or separates a stream already enriched in $CO_2$ by the $H_2$/CO-PSA system and depleted in $H_2S$ by the $H_2S$ removal system to provide the $CO_2$ product stream and a stream comprising $H_2$ or $H_2$ and CO. Any type of system suitable for effecting the above-mentioned separation may be used. For example, and as noted above, the further separation system may be a partial condensation system or a membrane separation system.

In the case of a partial condensation system, the stream to be separated by the system is cooled and separated into a condensate and a vapour, for example using one or more phase separators and/or distillation columns. The heavier components, namely $CO_2$ and, if present in the stream to be separated, $H_2S$ (and/or other sulphur containing components), are concentrated in the liquid phase, which therefore forms the stream further enriched in $CO_2$ and $H_2S$ or the $CO_2$ product stream. The lighter components, namely $H_2$ and, if present in the stream to be separated, CO, are concentrated in the gaseous phase, which therefore forms the stream comprising $H_2$ or $H_2$ and CO (which phase will, however, typically still contain some amount of the heavier components). Partial condensation processes that are suitable for use in the present invention are, for example, described in US-A1-2008/0173585 and US-A1-2008/0173584, the disclosures of which are incorporated herein by reference.

In the case of a membrane separation system, the stream to be separated is separated using one or more membranes that have selective permeability (i.e. that are more permeable to one or more components of the stream to be separated than they are to one or more other components of said stream), so as to effect separation of the stream to provide said stream comprising $H_2$ or $H_2$ and CO and said stream further enriched in $CO_2$ and $H_2S$ or said $CO_2$ product stream. For example, membranes may be used that are permeable to $H_2$ but largely impermeable to $CO_2$ and/or vice versa, such as are described in Journal of Membrane Science 327 (2009) 18-31, "Polymeric membranes for the hydrogen economy: Contemporary approaches and prospects for the future", the disclosure of which is incorporated herein by reference.

Where the further separation system is a partial condensation system, it is important that water and other components that may freeze out (e.g. $NH_3$ and trace levels of tars) are not present in the stream introduced into the separation system for separation, or are present in sufficiently small amounts (such as, for example, where the stream has a dew point of about −55° C. or less) that there is no risk for them freezing and blocking the heat exchanger of the condensation system (used to cool the stream as necessary for subsequent separation into condensate and vapour). The presence of water in the stream to be separated may also be undesirable for other types of further separation system. Where the process feed contains water a drying system, such as a temperature swing adsorption (TSA) system or absorptive (e.g. glycol, glycerol) system, may (if desired or necessary) therefore be used at any point upstream of the further separation system to ensure that the stream to the further separation system is sufficiently free of water.

For example, a drying system (such as a TSA system) separate from the $H_2$/CO-PSA system and the $H_2S$ removal system could be used at any point upstream of the further separation system (e.g. to dry the process feed prior to introduction of the same into the $H_2$/CO-PSA system or $H_2S$ removal system, or to dry the stream obtained from the $H_2$/CO-PSA system or, if upstream of the further separation system, the stream obtained from the $H_2S$ removal system) to ensure that the stream to the further separation system is sufficiently free of water. Alternatively or additionally, if the further separation system is downstream of the $H_2S$ removal system then the $H_2S$ removal system may remove water as well as $H_2S$, such that the stream received by the further separation system is sufficiently free of water. For example, where the $H_2S$ removal system is a sour-PSA system the sour-PSA system may, as described above, comprise adsorbent that is selective for water over $CO_2$ and, if present in the stream separated by the sour-PSA system, $H_2$ and CO.

Likewise, if the further separation system is a partial condensation system that uses an aluminium heat exchanger it may be necessary that the stream introduced into the partial condensation system does not contain any mercury, in which case a sulphur impregnated carbon bed could be used upstream of the partial condensation system to remove any mercury that may be present, and/or the $H_2S$ removal system may be used upstream of the condensation system and may be a sour-PSA system that functions to remove also mercury (as described above).

As noted above, where the further separation system separates a stream already enriched in $CO_2$ and $H_2S$ by the $H_2$/CO-PSA system, the further separation system provides a stream further enriched in $CO_2$ and $H_2S$ (i.e. a stream that is enriched in $CO_2$ and $H_2S$ relative to the stream already enriched in $CO_2$ and $H_2S$ by the $H_2$/CO-PSA system, and thus that is further enriched in $CO_2$ and $H_2S$ relative to the feed stream). The stream is preferably substantially, and may be entirely, free of $H_2$ and CO.

As noted above, the $CO_2$ product stream is obtained either by the $H_2S$ removal system processing a stream already enriched in $CO_2$ and $H_2S$ by the $H_2$/CO-PSA system and further enriched in $CO_2$ and $H_2S$ by the further separation system, or by the further separation system further separating a stream already enriched in $CO_2$ by the $H_2$/CO-PSA system and depleted in $H_2S$ by the $H_2S$ removal system. The $CO_2$ product stream is therefore both depleted in $H_2S$ relative to the feed stream, enriched in $CO_2$ relative to the stream already enriched in $CO_2$ (or in $CO_2$ and $H_2S$) by the $H_2$/CO-PSA system and thus further enriched in $CO_2$ relative to the feed stream. Preferably, the $CO_2$ product stream has an $H_2S$ concentration (or concentration of $H_2S$ and any other sulphur containing components) of about 100 ppm or less, more preferably about 50 ppm or less, more preferably about 25 ppm or less, and most preferably the stream is free of $H_2S$ (and any other sulphur containing components). Preferably, the $CO_2$ product stream has a $CO_2$ concentration of at least about 90%, more preferably at least about 95%, more preferably at least about 98%. The $CO_2$ product stream is preferably substantially, and may be entirely, free of $H_2$ and CO. The $CO_2$ product stream may be pure or essentially pure $CO_2$.

The $CO_2$ product stream is preferably compressed, piped and used for enhanced oil recovery (EOR) or sent to geological storage, or is to be used for such purposes, and therefore preferably has a level of purity suitable for such uses.

The stream comprising $H_2$ or $H_2$ and CO obtained from the further separation system will be enriched in $H_2$ and, if present in the process feed, CO relative to the stream separated by the further separation, but will typically still contain some $CO_2$ and, if present in the stream separated by the further separation system, $H_2S$ (due to complete separation of all $CO_2$ or $CO_2$ and $H_2S$ from all $H_2$ or $H_2$ and CO in the further separation system typically not being practical or economically viable). The stream comprising $H_2$ or $H_2$ and CO recovers sufficient $H_2$ or $H_2$ and CO from the stream fed to the further separation system that the stream further enriched in $CO_2$ and $H_2S$ or the $CO_2$ product stream produced by the further separation system is depleted in $H_2$ or $H_2$ and CO to the desired extent. Typically, this will require the stream comprising $H_2$ or $H_2$ and CO to recovers at least about 95%, and possibly about 99% or more the $H_2$ and (if present) CO present in the stream fed to the further separation system. The stream comprising $H_2$ or $H_2$ and CO may be used in a number of ways.

Some or all of said stream comprising $H_2$ or $H_2$ and CO may be recycled to the $H_2$/CO-PSA system for further separation thereof, thereby increasing the overall recovery of $H_2$ or $H_2$ and CO in the $H_2$/CO product stream. For example, some or all of the stream comprising $H_2$ or $H_2$ and CO may be compressed (if and as necessary) and admixed with or introduced concurrently with the stream sent to the $H_2$/CO-PSA system for separation (i.e. the process feed, or the $H_2S$ depleted stream obtained from the $H_2S$ removal system).

Some or all of said stream comprising $H_2$ or $H_2$ and CO may be used as an equalization or repressurisation gas in equalization or repressurisation steps in of the PSA cycle employed in the $H_2$/CO-PSA system (which, as compared to the previous option, may require less compression of the stream).

Some of said stream comprising $H_2$ or $H_2$ and CO may be recycled back into the further separation system for further separation. If the $H_2S$ removal system is upstream of the further separation system and said stream comprising $H_2$ or $H_2$ and CO still contains some $H_2S$ then some or all of said stream CO may be recycled to the $H_2S$ removal system for further separation.

Depending upon the level of any $CO_2$ in the resulting mixture, some or all of said stream comprising $H_2$ or $H_2$ and CO could be mixed with a portion or all of the $H_2$/CO product stream from $H_2$/CO-PSA system. Where, as is typical, the stream comprising $H_2$ or $H_2$ and CO contains some $CO_2$, combining at least a portion of the $H_2$/CO product and $H_2$ or $H_2$ and CO comprising streams in this way may be used to provide a product stream catering for chemicals applications in which the presence of some $CO_2$ may be desirable.

As already discussed, where the $H_2S$ removal system is a sour-PSA system, some or all of said stream comprising $H_2$ or $H_2$ and CO may be used as a purge gas (either on its own or in addition with other purge gases) for purging the sour-PSA.

Some or all of said stream comprising $H_2$ or $H_2$ and CO may be sent to a combustion system (e.g. a gas turbine, furnace or other suitable apparatus) and combusted to generate useful heat and/or power.

Where said stream comprising $H_2$ or $H_2$ and CO does contain CO, some or all of the stream may be combusted in the presence of sufficient $O_2$ to convert substantially all $H_2$ and CO present in the part of the stream combusted to $H_2O$ to $CO_2$. The combustion effluent may then be cooled and compressed to condense out water, which may produce a $CO_2$ stream of sufficient purity for compression and geological storage or use in EOR alongside the aforementioned $CO_2$ product stream. Where the stream comprising $H_2$ or $H_2$ and CO contains some $H_2S$ this will converted to $SO_x$ by the combustion reaction, and $SO_x$ can then be converted to and separated out as sulfuric acid by maintaining the cooled and compressed combustion effluent at elevated pressure, in the presence of $O_2$, water and $NO_x$. This process may be conducted as further described in US-A1-2007/0178035, the disclosure of which is incorporated herein by reference.

Some or all of said stream comprising $H_2$ or $H_2$ and CO may simply be vented, flared or otherwise disposed of. Venting or flaring of at least a portion of said stream may, in particular, be necessary where the feed stream contains additional impurities which otherwise cannot be removed (i.e. because they are not removed alongside $H_2S$ in the $H_2S$ removal system, are not separated out with $H_2$ or $H_2$ and CO by the $H_2$/CO-PSA system, and are not separated alongside $CO_2$ in the further separation system) and which, if not vented or flared, would build up in the systems.

Said stream comprising $H_2$ or $H_2$ and CO may also be heated and expanded to make power, prior to or as an alternative to any of the aforementioned uses.

As noted at the outset, the $H_2$/CO-PSA system, $H_2S$ removal system and further separation system are arranged such that: the $H_2$/CO-PSA system either receives the feed stream, or is located downstream of the $H_2S$ removal system which in that event receives the feed stream; the $H_2S$ removal system, if not receiving the feed stream, may be located downstream of either or both of the $H_2$/CO-PSA system and the $CO_2$ separation system; and the further separation system is always positioned downstream of the $H_2$/CO-PSA system, and may be upstream or downstream of the $H_2S$ removal system.

Thus, in one embodiment (hereinafter, the "first embodiment") of the method of the present invention:
  the feed stream is introduced into the $H_2$/CO-PSA system;
  the $H_2$/CO-PSA system separates the feed stream to provide the $H_2$/CO product stream and a stream enriched in $CO_2$ and $H_2S$;
  the $H_2S$ removal system processes said stream enriched in $CO_2$ and $H_2S$ to provide a stream enriched in $CO_2$ and depleted in $H_2S$; and
  the further separation system separates said stream enriched in $CO_2$ and depleted in $H_2S$ to provide the $CO_2$ product stream and a stream comprising $H_2$ or $H_2$ and CO.

Further preferred features of this first embodiment, such as use of the $H_2S$ removal system to remove also water, use of a sour-PSA system as the $H_2S$ removal system, uses of the $H_2S$ enriched stream also produced by the sour-PSA system, possible uses of the stream comprising $H_2$ or $H_2$ and CO, preferred compositions of the various stream, and so forth, will be apparent from the forgoing general description of the method.

This embodiment provides similar results to the current commercially used methods (e.g. Selexol™, Rectisol®) of separating sour syngas streams, in terms of providing a $H_2$/CO product for refinery/chemicals/power applications, a $CO_2$ product for geological storage or EOR, and optionally a $H_2S$ containing product suitable for use in a Claus reaction, but at lower cost and with lower power requirements than said commercially used methods.

In another embodiment (hereinafter, the "second embodiment") of the method of the present invention:
  the feed stream is introduced into the $H_2S$ removal system;
  the $H_2S$ removal system processes the feed stream to provide a stream depleted in $H_2S$;
  the $H_2$/CO-PSA system separates said stream depleted in $H_2S$ to provide the $H_2$/CO product stream and a stream enriched in $CO_2$ and depleted in $H_2S$; and
  the further separation system separates said stream enriched in $CO_2$ and depleted in $H_2S$ to provide the $CO_2$ product stream and a stream comprising $H_2$ or $H_2$ and CO.

Further preferred features of this embodiment will again be apparent from the forgoing general description of the method.

As compared to the aforementioned first embodiment, the method according to this second embodiment has certain advantages and disadvantages. The disadvantages are that: there are, if a sour-PSA system is used as the $H_2S$ removal system, two PSA systems in the $H_2$/CO product stream producing line, which may result in an increased pressure drop; the concentration of $H_2S$ in the feed stream is less than that in the stream to the $H_2S$ removal system in the first embodiment, which makes $H_2S$ removal harder; the feed gas volumes are greater, which means larger vessel sizes are needed to prevent fluidization; and, where a $H_2S$ removal system is used that also produces an $H_2S$ enriched stream, there is likely to be a relatively greater amount of $H_2$ or $H_2$ and CO in the $H_2S$ enriched stream (and thus potentially lost as $H_2$ and/or CO product). The advantages are that: $H_2S$ is reduced in the $CO_2$ enriched stream produced from the $H_2$/CO-PSA system, which therefore does not need to be recompressed in any recompression of this stream prior to further separation in the further separation system; and there may be a lower pressure drop in the $CO_2$ product stream producing line.

In another embodiment (hereinafter, the "third embodiment") of the method of the present invention:
  the feed stream is introduced into the $H_2$/CO-PSA system;
  the $H_2$/CO-PSA system separates the feed stream to provide the $H_2$/CO product stream and a stream enriched in $CO_2$ and $H_2S$;
  the further separation system separates said stream enriched in $CO_2$ and $H_2S$ to provide a stream further enriched in $CO_2$ and $H_2S$ and a stream comprising $H_2$ or $H_2$ and CO; and
  the $H_2S$ removal system processes said stream further enriched in $CO_2$ and $H_2S$ to provide the $CO_2$ product stream.

Further preferred features of this embodiment will again be apparent from the forgoing general description of the method.

As compared to the first embodiment, the method according to this third embodiment also has certain advantages and disadvantages. The advantages are that, where a $H_2S$ removal system is used that also produces an $H_2S$ enriched stream, the $H_2S$ concentration in this $H_2S$ enriched stream is likely to be higher due to the removal of more $H_2$ or $H_2$ and CO upstream of the $H_2S$ removal system, and the loss of $H_2$ or $H_2$ and CO in the $H_2S$ enriched stream should therefore also be reduced. The disadvantages are that: the possibility of using the $H_2S$ removal system to produce a dried feed to the further separation system is removed, which may therefore necessitate use of an additional TSA or other form of drying system that is not negatively effected by the presence of $H_2S$ in the stream; and there will likely also be at least some $H_2S$ present in the stream comprising $H_2$ or $H_2$ and CO produced by the further separation system.

The apparatus of the invention may comprise:
  an $H_2$/CO-PSA system for separating the feed stream to provide the $H_2$/CO product stream and a stream enriched in $CO_2$ and $H_2S$;
  a conduit arrangement for introducing the feed stream into the $H_2$/CO-PSA system;
  a conduit arrangement for withdrawing the $H_2$/CO product stream from the $H_2$/CO-PSA system;
  an $H_2S$ removal system, for processing said stream enriched in $CO_2$ and $H_2S$ to provide a stream enriched in $CO_2$ and depleted in $H_2S$;
  a conduit arrangement for withdrawing the stream enriched in $CO_2$ and $H_2S$ from the $H_2$/CO-PSA system and introducing the stream into the $H_2S$ removal system;
  a further separation system, for separating said stream enriched in $CO_2$ and depleted in $H_2S$ to provide the $CO_2$ product stream and a stream comprising $H_2$ or $H_2$ and CO;

a conduit arrangement for withdrawing the stream enriched in $CO_2$ and depleted in $H_2S$ from the $H_2S$ removal system and introducing the stream into the further separation system;

a conduit arrangement for withdrawing the $CO_2$ product stream from the further separation system; and a conduit arrangement for withdrawing the stream comprising $H_2$ or $H_2$ and CO from the further separation system.

Alternatively, the apparatus of the invention may comprise:

an $H_2S$ removal system, for processing the feed stream to provide a stream depleted in $H_2S$;

a conduit arrangement for introducing the feed stream into the $H_2S$ removal system;

an $H_2$/CO-PSA system for separating said stream depleted in $H_2S$ to provide the $H_2$/CO product stream and a stream enriched in $CO_2$ and depleted in $H_2S$;

a conduit arrangement for withdrawing the stream depleted in $H_2S$ from the $H_2S$ removal system and introducing the stream into the $H_2$/CO-PSA system;

a conduit arrangement for withdrawing the $H_2$/CO product stream from the $H_2$/CO-PSA system;

a further separation system, for separating said stream enriched in $CO_2$ and depleted in $H_2S$ to provide the $CO_2$ product stream and a stream comprising $H_2$ or $H_2$ and CO;

a conduit arrangement for withdrawing the stream enriched in $CO_2$ and depleted in $H_2S$ from the $H_2$/CO-PSA system and introducing the stream into the further separation system;

a conduit arrangement for withdrawing the $CO_2$ product stream from the further separation system; and a conduit arrangement for withdrawing the stream comprising $H_2$ or $H_2$ and CO from the further separation system.

Alternatively, the apparatus of the invention may comprise:

an $H_2$/CO-PSA system for separating the feed stream to provide the $H_2$/CO product stream and a stream enriched in $CO_2$ and $H_2S$;

a conduit arrangement for introducing the feed stream into the $H_2$/CO-PSA system;

a conduit arrangement for withdrawing the $H_2$/CO product stream from the $H_2$/CO-PSA system;

a further separation system, for separating said stream enriched in $CO_2$ and $H_2S$ to provide a stream further enriched in $CO_2$ and $H_2S$ and a stream comprising $H_2$ or $H_2$ and CO;

a conduit arrangement for withdrawing the stream enriched in $CO_2$ and $H_2S$ from the $H_2$/CO-PSA system and introducing the stream into the further separation system;

a conduit arrangement for withdrawing the stream comprising $H_2$ or $H_2$ and CO from the further separation system;

an $H_2S$ removal system, for processing said stream further enriched in $CO_2$ and $H_2S$ to provide the $CO_2$ product stream;

a conduit arrangement for withdrawing the stream further enriched in $CO_2$ and $H_2S$ from the further separation system and introducing the stream into the $H_2S$ removal system; and a conduit arrangement for withdrawing the $CO_2$ product stream from the $H_2S$ removal system.

Preferred features of these apparatus will be apparent from the forgoing description of the method.

Aspects of the invention include:

1. A method for separating a feed stream, comprising $H_2S$, $CO_2$, $H_2$ and optionally CO, into at least a $CO_2$ product stream and an $H_2$ or $H_2$ and CO product stream (the "$H_2$/CO product stream"), wherein the feed stream is separated using a pressure swing adsorption system (the "$H_2$/CO-PSA system"), an $H_2S$ removal system, and a further separation system, and wherein:

the feed stream is introduced into either the $H_2$/CO-PSA system or the $H_2S$ removal system;

the $H_2$/CO-PSA system either separates the feed stream to provide the $H_2$/CO product stream and a stream enriched in $CO_2$ and $H_2S$, or separates a stream already depleted in $H_2S$ by the $H_2S$ removal system to provide the $H_2$/CO product stream and a stream enriched in $CO_2$ and depleted in $H_2S$;

the $H_2S$ removal system either processes the feed stream to provide a stream depleted in $H_2S$, or processes a stream already enriched in $CO_2$ and $H_2S$ by the $H_2$/CO-PSA system to provide a stream enriched in $CO_2$ and depleted in $H_2S$, or processes a stream already enriched in $CO_2$ and $H_2S$ by the $H_2$/CO-PSA system and further enriched in $CO_2$ and $H_2S$ by the further separation system to provide the $CO_2$ product stream; and the further separation system either separates a stream already enriched in $CO_2$ and $H_2S$ by the $H_2$/CO-PSA system to provide a stream further enriched in $CO_2$ and $H_2S$ and a stream comprising $H_2$ or $H_2$ and CO, or separates a stream already enriched in $CO_2$ by the $H_2$/CO-PSA system and depleted in $H_2S$ by the $H_2S$ removal system to provide the $CO_2$ product stream and a stream comprising $H_2$ or $H_2$ and CO.

2. A method according to #1, wherein the $H_2S$ removal system separates the feed stream, or said stream already enriched in $CO_2$ and $H_2S$ by the $H_2$/CO-PSA system, or said stream already enriched in $CO_2$ and $H_2S$ by the $H_2$/CO-PSA system and further enriched in $CO_2$ and $H_2S$ by the further separation system, to provide an $H_2S$ enriched stream in addition to providing said stream depleted in $H_2S$, said stream enriched in $CO_2$ and depleted in $H_2S$, or said $CO_2$ product stream.

3. A method according to #2, wherein the $H_2S$ enriched stream has a $H_2S$ concentration of from about 20 to about 80 mol %.

4. A method according to #2 or #3, wherein the $H_2S$ removal system is another pressure swing adsorption system (the "sour-PSA system").

5. A method according to #4, wherein steam is used as a purge gas for purging the sour-PSA.

6. A method according to #4 or #5, wherein some or all of the stream comprising $H_2$ or $H_2$ and CO obtained from the further separation system is used as a purge gas for purging the sour-PSA.

7. A method according to any of #1 to #6, wherein some or all of the stream comprising $H_2$ or $H_2$ and CO obtained from the further separation system is recycled to the $H_2$/CO-PSA system for further separation.

8. A method according to any of #1 to #7, wherein some or all of the stream comprising $H_2$ or $H_2$ and CO obtained from the further separation system is combusted to generate power.

9. A method according to any of #1 to #8, wherein some or all of the stream comprising $H_2$ or $H_2$ and CO obtained from the further separation system is combusted in the presence of sufficient $O_2$ to convert all or substantially all of the $H_2$ and CO in the part of the stream combusted to $H_2O$ and $CO_2$.

10. A method according to any of #1 to #9, wherein the further separation system is a partial condensation system.

11. A method according to any of #1 to #9, wherein the further separation system is a membrane separation system.

12. A method according to any of #1 to #11, wherein the feed stream is formed from a sour syngas stream obtained from gasification of solid or liquid carbonaceous feedstock.

13. A method according to any of #1 to #12, wherein the feed stream comprises from about 500 ppm to about 5 mole % $H_2S$, from about 10 to about 60 mole % $CO_2$, and from about 35 mole % to the remainder of $H_2$ or a mixture of $H_2$ and CO.

14. A method according to any of #1 to #13, wherein at least about 80% of the $H_2$ present in the feed stream is recovered in the $H_2$/CO product stream and at most about 25% of the $CO_2$ present in the feed stream is recovered the $H_2$/CO product stream, and wherein the $H_2$/CO product stream contains at most about 50 ppm $H_2S$.

15. A method according to any of #1 to #14, wherein at least about 75% of the $H_2$ and CO present in the feed stream is recovered the $H_2$/CO product stream and at most about 25% of the $CO_2$ present in the feed stream is recovered the $H_2$/CO product stream, and wherein the $H_2$/CO product stream contains at most about 50 ppm $H_2S$.

16. A method according to any of #1 to #15, wherein the $CO_2$ product stream has a $CO_2$ concentration of at least about 90 mole % and contains at most about 100 ppm $H_2S$.

17. A method according to any of #1 to #16, wherein:
the feed stream is introduced into the $H_2$/CO-PSA system;
the $H_2$/CO-PSA system separates the feed stream to provide the $H_2$/CO product stream and a stream enriched in $CO_2$ and $H_2S$;
the $H_2S$ removal system processes said stream enriched in $CO_2$ and $H_2S$ to provide a stream enriched in $CO_2$ and depleted in $H_2S$; and
the further separation system separates said stream enriched in $CO_2$ and depleted in $H_2S$ to provide the $CO_2$ product stream and a stream comprising $H_2$ or $H_2$ and CO.

18. A method according to #17, wherein feed stream further comprises water, and the $H_2S$ removal system processes said stream enriched in $CO_2$ and $H_2S$ to provide a stream enriched in $CO_2$ and depleted in $H_2S$ and water.

19. A method according to any of #1 to #16, wherein:
the feed stream is introduced into the $H_2S$ removal system;
the $H_2S$ removal system processes the feed stream to provide a stream depleted in $H_2S$;
the $H_2$/CO-PSA system separates said stream depleted in $H_2S$ to provide the $H_2$/CO product stream and a stream enriched in $CO_2$ and depleted in $H_2S$; and
the further separation system separates said stream enriched in $CO_2$ and depleted in $H_2S$ to provide the $CO_2$ product stream and a stream comprising $H_2$ or $H_2$ and CO.

20. A method according to any of #19, wherein feed stream further comprises water, and the $H_2S$ removal system processes the feed stream to provide a stream depleted in $H_2S$ and water.

21. A method according to any of #1 to #16, wherein:
the feed stream is introduced into the $H_2$/CO-PSA system;
the $H_2$/CO-PSA system separates the feed stream to provide the $H_2$/CO product stream and a stream enriched in $CO_2$ and $H_2S$;
the further separation system separates said stream enriched in $CO_2$ and $H_2S$ to provide a stream further enriched in $CO_2$ and $H_2S$ and a stream comprising $H_2$ or $H_2$ and CO;
the $H_2S$ removal system processes said stream further enriched in $CO_2$ and $H_2S$ to provide the $CO_2$ product stream.

22. Apparatus for separating a feed stream, comprising $H_2S$, $CO_2$, $H_2$ and optionally CO, into at least a $CO_2$ product stream and an $H_2$ or $H_2$ and CO product stream (the "$H_2$/CO product stream"), the apparatus comprising:
a pressure swing adsorption system (the "$H_2$/CO-PSA system") for separating the feed stream to provide the $H_2$/CO product stream and a stream enriched in $CO_2$ and $H_2S$;
a conduit arrangement for introducing the feed stream into the $H_2$/CO-PSA system;
a conduit arrangement for withdrawing the $H_2$/CO product stream from the $H_2$/CO-PSA system;
an $H_2S$ removal system, for processing said stream enriched in $CO_2$ and $H_2S$ to provide a stream enriched in $CO_2$ and depleted in $H_2S$;
a conduit arrangement for withdrawing the stream enriched in $CO_2$ and $H_2S$ from the $H_2$/CO-PSA system and introducing the stream into the $H_2S$ removal system;
a further separation system, for separating said stream enriched in $CO_2$ and depleted in $H_2S$ to provide the $CO_2$ product stream and a stream comprising $H_2$ or $H_2$ and CO;
a conduit arrangement for withdrawing the stream enriched in $CO_2$ and depleted in $H_2S$ from the $H_2S$ removal system and introducing the stream into the further separation system;
a conduit arrangement for withdrawing the $CO_2$ product stream from the further separation system; and
a conduit arrangement for withdrawing the stream comprising $H_2$ or $H_2$ and CO from the further separation system.

23. Apparatus for separating a feed stream, comprising $H_2S$, $CO_2$, $H_2$ and optionally CO, into at least a $CO_2$ product stream and an $H_2$ or $H_2$ and CO product stream (the "$H_2$/CO product stream"), the apparatus comprising:
an $H_2S$ removal system, for processing the feed stream to provide a stream depleted in $H_2S$;
a conduit arrangement for introducing the feed stream into the $H_2S$ removal system;
a pressure swing adsorption system (the "$H_2$/CO-PSA system") for separating said stream depleted in $H_2S$ to provide the $H_2$/CO product stream and a stream enriched in $CO_2$ and depleted in $H_2S$;
a conduit arrangement for withdrawing the stream depleted in $H_2S$ from the $H_2S$ removal system and introducing the stream into the $H_2$/CO-PSA system;
a conduit arrangement for withdrawing the $H_2$/CO product stream from the $H_2$/CO-PSA system;
a further separation system, for separating said stream enriched in $CO_2$ and depleted in $H_2S$ to provide the $CO_2$ product stream and a stream comprising $H_2$ or $H_2$ and CO;
a conduit arrangement for withdrawing the stream enriched in $CO_2$ and depleted in $H_2S$ from the $H_2$/CO-PSA system and introducing the stream into the further separation system;
a conduit arrangement for withdrawing the $CO_2$ product stream from the further separation system; and
a conduit arrangement for withdrawing the stream comprising $H_2$ or $H_2$ and CO from the further separation system.

24. Apparatus for separating a feed stream, comprising $H_2S$, $CO_2$, $H_2$ and optionally CO, into at least a $CO_2$ product stream and an $H_2$ or $H_2$ and CO product stream (the "$H_2$/CO product stream"), the apparatus comprising:

a pressure swing adsorption system (the "H₂/CO-PSA system") for separating the feed stream to provide the H₂/CO product stream and a stream enriched in CO₂ and H₂S;

a conduit arrangement for introducing the feed stream into the H₂/CO-PSA system;

a conduit arrangement for withdrawing the H₂/CO product stream from the H₂/CO-PSA system;

a further separation system, for separating said stream enriched in CO₂ and H₂S to provide a stream further enriched in CO₂ and H₂S and a stream comprising H₂ or H₂ and CO;

a conduit arrangement for withdrawing the stream enriched in CO₂ and H₂S from the H₂/CO-PSA system and introducing the stream into the further separation system;

a conduit arrangement for withdrawing the stream comprising H₂ or H₂ and CO from the further separation system;

an H₂S removal system, for processing said stream further enriched in CO₂ and H₂S to provide the CO₂ product stream;

a conduit arrangement for withdrawing the stream further enriched in CO₂ and H₂S from the further separation system and introducing the stream into the H₂S removal system; and a conduit arrangement for withdrawing the CO₂ product stream from the H₂S removal system.

Solely by way of example, certain embodiments of the invention will now be described with reference to the accompanying drawings.

Referring to FIG. 1, a feed stream (1) is fed to a H₂/CO-PSA system (101) at 6 MPa (60 bar) absolute. The composition of the feed stream is 1.0 mol % H₂S, 39.0 mol % CO₂ and 60.0 mol % of a mixture of H₂ and CO (figures rounded to the nearest 0.1 mol %). The H₂/CO-PSA system (101) separates the feed (1) into a H₂ and CO product stream (2) and a stream (3) enriched in CO₂ and H₂S. The H₂ and CO product stream (2) is produced at 6 MPa (60 bar) absolute, and is 6.1 mol % CO₂ and 93.9 mol % H₂ and CO. The CO₂ and H₂S enriched stream (3) is produced at 0.1 MPa (1 bar) absolute, and is 2.0 mol % H₂S, 77.0 mol % CO₂, and 21.0 mol % H₂ and CO.

The H₂ and CO product stream (2) can be sent for combustion and expansion of the resulting combustion effluent in a gas turbine (not shown) or used for chemicals production in a chemicals plant (not shown). The CO₂ and H₂S enriched stream (3) is sent to a compressor (102) and compressed to 3.1 MPa (31 bar) absolute. The compressed CO₂ and H₂S enriched stream (4) is then introduced into a sour-PSA system (103) where it is separated into an H₂S enriched stream (7) and a H₂S depleted, CO₂ enriched stream (5).

The H₂S enriched stream (7), produced at 0.1 MPa (1 bar) absolute, is 40.0 mol % H₂S and 60.0 mol % CO₂ (it may include trace amounts of H₂/CO) and can be sent to a sulphur recovery system, such as for example a Claus plant (not shown), for conversion of the H₂S into elemental sulphur.

The stream depleted in H₂S and enriched in CO₂ (5), which is produced at 3.1 MPa (31 bar) absolute, is 77.8 mol % CO₂ and 22.2 mol % H₂ and CO and is transferred to a partial condensation system (104) where it is cooled to about −55° C. to partially condense the stream. The partially condensed stream is then separated, using one or more flash drums (phase separators) and/or distillation columns into a liquid further enriched in CO₂ and vapour comprising CO₂, H₂ and CO. Due to the vapour pressure of CO₂ at −55° C., the vapour is 25.0 mol % CO₂, the remainder (i.e. 75.0 mol %) being H₂ and CO. No compression of the of the H₂S depleted, CO₂ enriched stream (5) is, in the depicted flow sheet, required prior to introduction of the stream into the partial condensation system (104), although if this stream were to be produced at a lower pressure than that required of the feed to the partial condensation system then a further compressor could be added between the sour-PSA system (103) and partial condensation system (104).

The liquid condensate, which is 99.0 mol % CO₂ and 1.0 mol % H₂ and CO, is withdrawn from the partial condensation system (104) as CO₂ product stream (6). This stream may be pumped to another location in its liquid state, or it may be vaporized and compressed in a further compressor (105) to a sufficient pressure, such as 12 MPa (120 bar) absolute, to be piped as a stream (9) to a geological storage site or used for EOR.

The vapour comprising CO₂, H₂ and CO is withdrawn as gas stream (8), at 3 MPa (30 bar) absolute, and can be used in a number of ways or simply disposed of. For example, a portion or all of this gas stream may be vented (not shown), used as feed to some other process (not shown), admixed with the H₂/CO-product stream (2) from the H₂/CO-PSA system (101) (not shown), compressed in another compressor (106) and recycled to the H₂/CO-PSA system (101) by being added to the process feed (1) (as shown by the dashed line in FIG. 1), used as a purge gas for the sour-PSA system (103) (not shown), or recycled to the partial condensation system (104) for further separation (not shown).

The H₂/CO-PSA system (101) and sour-PSA system (103) may be operated using any of a variety of different PSA cycles, as will be well known to one of ordinary skill in the art.

Figure 2:
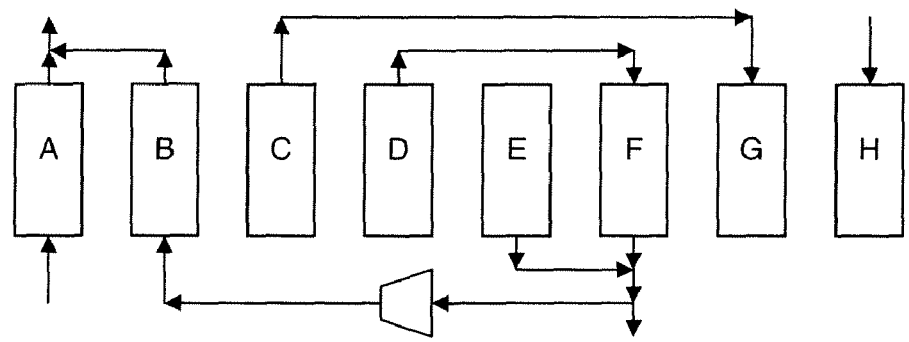
FIG. 2 is a flow sheet depicting an exemplary rinse design for the sour-PSA system.

For example, referring to FIG. 2 and Table 1, the sour-PSA system (103) may comprise 8 beds, arranged in parallel and designated in FIG. 2 as A to H. Each bed undergoes a PSA cycle involving the following steps in the following order: feed; rinse; equalization; provide purge; blowdown/depressurization; purge; equalization; repressurisation (one equalization step is shown, although more may be used in practice). The cycles of the beds are staggered as shown in FIG. 2 and described in Table 1, wherein at the point in time depicted in FIG. 2:

bed A is undergoing feed with the CO₂ and H₂S enriched stream (4) and adsorbing H₂S;

bed B is undergoing rinse using a portion of the H₂S gases obtained from beds E and F, the gas pushed through bed B being combined with the gas pushed through from bed A to provide the H₂S depleted, CO₂ enriched stream (5);

bed C is providing equalization gas to bed G;

bed D is providing a CO₂ enriched purge gas to bed F;

bed E is undergoing blowdown, the gas obtained being combined with the gas obtained from bed F;

bed F is undergoing purge with CO₂ enriched purge gas from bed D, the combined gases obtained from beds E and F being combined to provide the H₂S enriched stream (7) and the rinse gas to bed B;

bed G is receiving equalization gas from bed C; and bed H is undergoing repressurisation, using a portion of the CO₂ and H₂S enriched stream (4).

Figure 3:
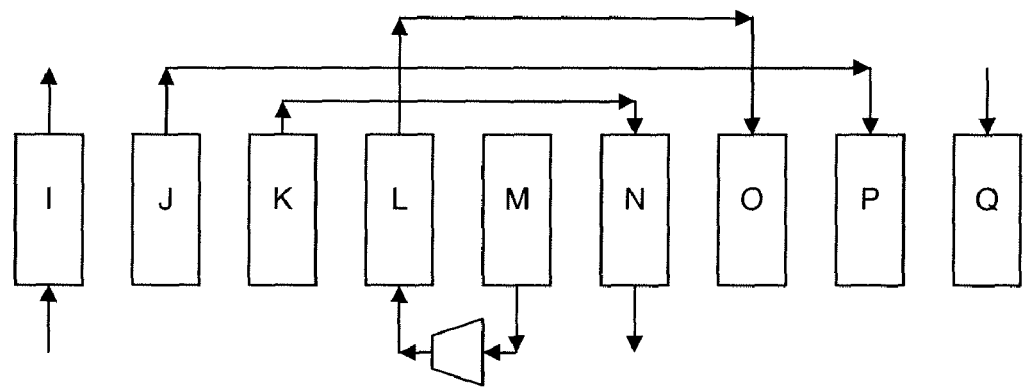
FIG. 3 is a flow sheet depicting another rinse design for the sour-PSA system.
Figure 4:
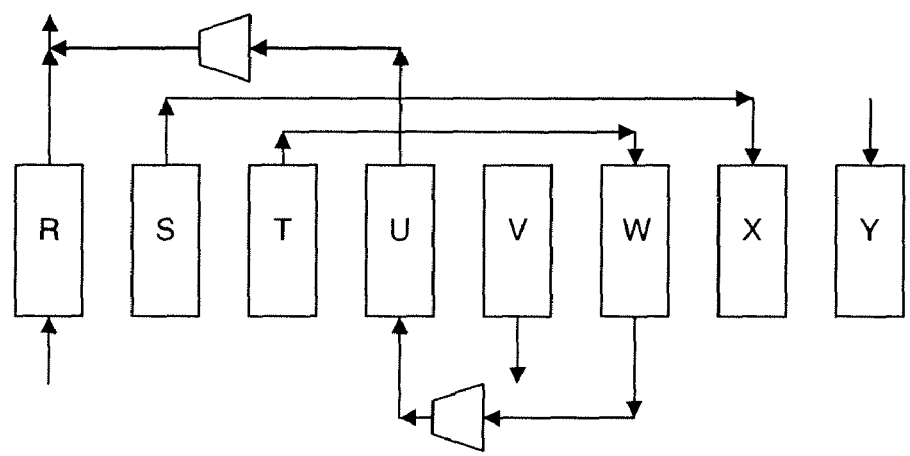
FIG. 4 is a flow sheet depicting another rinse design for the sour-PSA system.

Referring to FIG. 3 and Table 2, an alternative PSA cycle is shown, wherein the sour-PSA system (103) comprises 9 beds, arranged in parallel and designated in FIG. 4 as I to Q. Each bed goes undergoes a PSA cycle involving the following steps in the following order: feed; equalization; provide purge; rinse; blowdown/depressurization; purge; accept rinse; equalization; repressurisation. The cycles of the beds are staggered as shown in FIG. 3 and further described in Table 2.

Referring to FIG. 4 and Table 3, another PSA cycle is shown, wherein the sour-PSA system (103) comprises 8 beds, arranged in parallel and designated in FIG. 4 as R to Y. Each bed goes undergoes a PSA cycle involving the following steps in the following order: feed; equalization; provide purge; rinse; blowdown/depressurization; purge; equalization; repressurisation. The cycles of the beds are staggered as shown in FIG. 4 and further described in Table 3.

TABLE 1

| Bed | Step | End of Step Pressure (bar absolute) | Feed Gas | Product Gas |
|---|---|---|---|---|
| A | Feed | 31 | $CO_2$ & $H_2S$ | $CO_2$ |
| B | Rinse (combine with product gas) | 31 | $H_2S$ | $CO_2$ |
| C | Equalisation | 16 | — | $CO_2$ |
| D | Provide $CO_2$ Purge | 10 | — | $CO_2$ |
| E | Blowdown/Depressurisation | 1 | — | $H_2S$ |
| F | Purge with $CO_2$ | 1 | $CO_2$ | $H_2S$ |
| G | Equalisation | 16 | $CO_2$ | — |
| H | Repressurisation with Product | 31 | $CO_2$ | — |

TABLE 2

| Bed | Step | End of Step Pressure (bar absolute) | Feed Gas | Product Gas |
|---|---|---|---|---|
| I | Feed | 31 | $CO_2$ & $H_2S$ | $CO_2$ |
| J | Equalisation | 18 | — | $CO_2$ |
| K | Provide $CO_2$ Purge | 12 | — | $CO_2$ |
| L | Rinse (to another vessel) | 12 | $H_2S$ | $CO_2$ |
| M | Blowdown/Depressurisation | 1 | — | $H_2S$ |
| N | Purge | 1 | $CO_2$ | $H_2S$ |
| O | Accept Rinse Gas | 5 | $CO_2$ | — |
| P | Equalisation | 18 | $CO_2$ | — |
| Q | Repressurisation with Product | 31 | $CO_2$ | — |

TABLE 3

| Bed | Step | End of Step Pressure (bar absolute) | Feed Gas | Product Gas |
|---|---|---|---|---|
| R | Feed | 31 | $CO_2$ & $H_2S$ | $CO_2$ |
| S | Equalisation | 16 | — | $CO_2$ |
| T | Provide $CO_2$ Purge | 10 | — | $CO_2$ |
| U | Rinse (combine product gases) | 10 | $H_2S$ | $CO_2$ |
| V | Blowdown/Depressurisation | 1 | — | $H_2S$ |
| W | Purge | 1 | $CO_2$ | $H_2S$ |
| X | Equalisation | 16 | $CO_2$ | — |
| Y | Repressurisation with Product | 31 | $CO_2$ | — |

Figure 5:
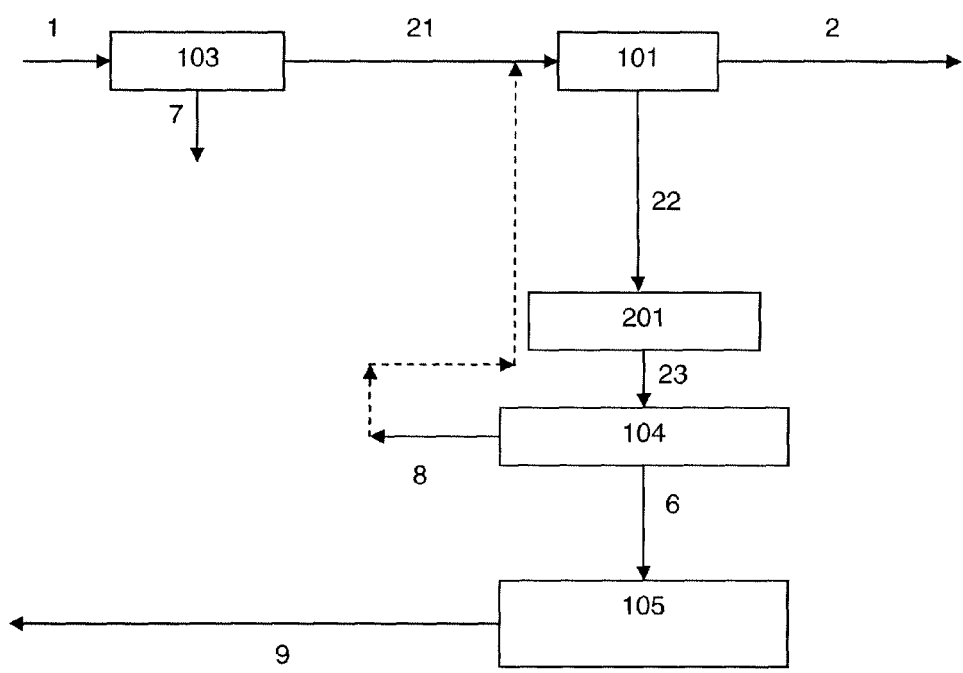
FIG. 5 is a flow sheet depicting another embodiment of the present invention.

Referring to FIG. 5, a flow sheet depicting an alternative embodiment of the invention is shown, in which the same reference numerals have been used as in FIG. 1 to denote common features. In this embodiment the feed stream (1) is fed, at 3 MPa (30 bar) absolute, to sour-PSA system (103). The composition of the feed stream (1) is again 1.0 mol % $H_2S$, 39.0 mol % $CO_2$ and 60.0 mol % of a mixture of $H_2$ and CO (figures rounded to the nearest 0.1 mol %).

The sour-PSA system (103) separates the feed (1) into an $H_2S$ enriched stream (7) and a $H_2S$ depleted stream (25). The $H_2S$ enriched stream (7), produced at 0.1 MPa (1 bar) absolute, is 25.0 mol % $H_2S$ and 75.0 mol % $CO_2$ and may, again, be sent to a sulphur recovery system (not shown) for conversion of the $H_2S$ into elemental sulphur. The $H_2S$ depleted stream (21) is produced at 3 MPa (30 bar) absolute, and is 37.5 mol % $CO_2$ and 62.5 mol % $H_2$ and CO.

The $H_2S$ depleted stream (21) is transferred to $H_2$/CO-PSA system (101) which separates the $H_2S$ depleted stream (21) into an $H_2$ and CO product stream (2) and a stream (22) enriched in $CO_2$ (and which remains depleted in $H_2S$). In the flow sheet depicted the $H_2S$ depleted stream (21) is not further compressed prior to being introduced into the $H_2$/CO-PSA system (101), but further compression could of course be provided if required. The $H_2$ and CO product stream (2) is produced at the same pressure as the $H_2S$ depleted stream (25), i.e. 3 MPa (30 bar) absolute, and is again 6.1 mol % $CO_2$ and 93.9 mol % $H_2$ and CO. The $CO_2$ enriched and $H_2S$ depleted stream (22) is produced at 0.1 MPa (1 bar) absolute, and is 77.1 mol % $CO_2$, and 22.9 mol % $H_2$ and CO.

The $H_2$ and CO product stream (2) can, as discussed above, be sent for combustion and expansion of the resulting combustion effluent in a gas turbine (not shown) or used for chemicals production in a chemicals plant (not shown). The $CO_2$ enriched and $H_2S$ depleted stream (22) is sent to a compressor (201) and compressed to 3.0 MPa (30 bar) absolute. The compressed $CO_2$ enriched and $H_2S$ depleted stream (23) is then introduced into partial condensation system (104).

Partial condensation system (104) cools the compressed $CO_2$ enriched and $H_2S$ depleted stream (23) to about −55° C. to partially condense the stream. The partially condensed stream is then separated, using one or more flash drums (phase separators) and/or distillation columns into a liquid further enriched in $CO_2$ and vapour comprising $CO_2$, $H_2$ and CO. Due to the vapour pressure of $CO_2$ at −55° C., the vapour is 25.0 mol % $CO_2$, the remainder (i.e. 75.0 mol %) being $H_2$ and CO.

The liquid condensate, which is 99.0 mol % $CO_2$ and 1.0 mol % $H_2$ and CO, is withdrawn from the partial condensation system (104) as $CO_2$ product stream (6). This stream may again be pumped to another location in its liquid state, or vaporized and compressed in a further compressor (105) to a sufficient pressure, such as 12 MPa (120 bar) absolute, to be piped as a stream (9) to a geological storage site or used for EOR.

The vapour comprising $CO_2$, $H_2$ and CO is withdrawn as gas stream (8), at 3 MPa (30 bar) absolute, and can again be used in a number of ways or simply disposed of, as discussed above. In the flow sheet depicted in FIG. 5, the gas stream is recycled to the $H_2$/CO-PSA system (101) by being added to the $H_2S$ depleted stream (21) (as shown by the dashed line in FIG. 5).

The $H_2$/CO-PSA system (101) and sour-PSA system (103) may again be operated using any of a variety of different PSA cycles, as will be well known to one of ordinary skill in the art. The sour-PSA system (103) may, for example, be operated via any of the cycles described above with reference to FIGS. 2 to 4.

Figure 6:
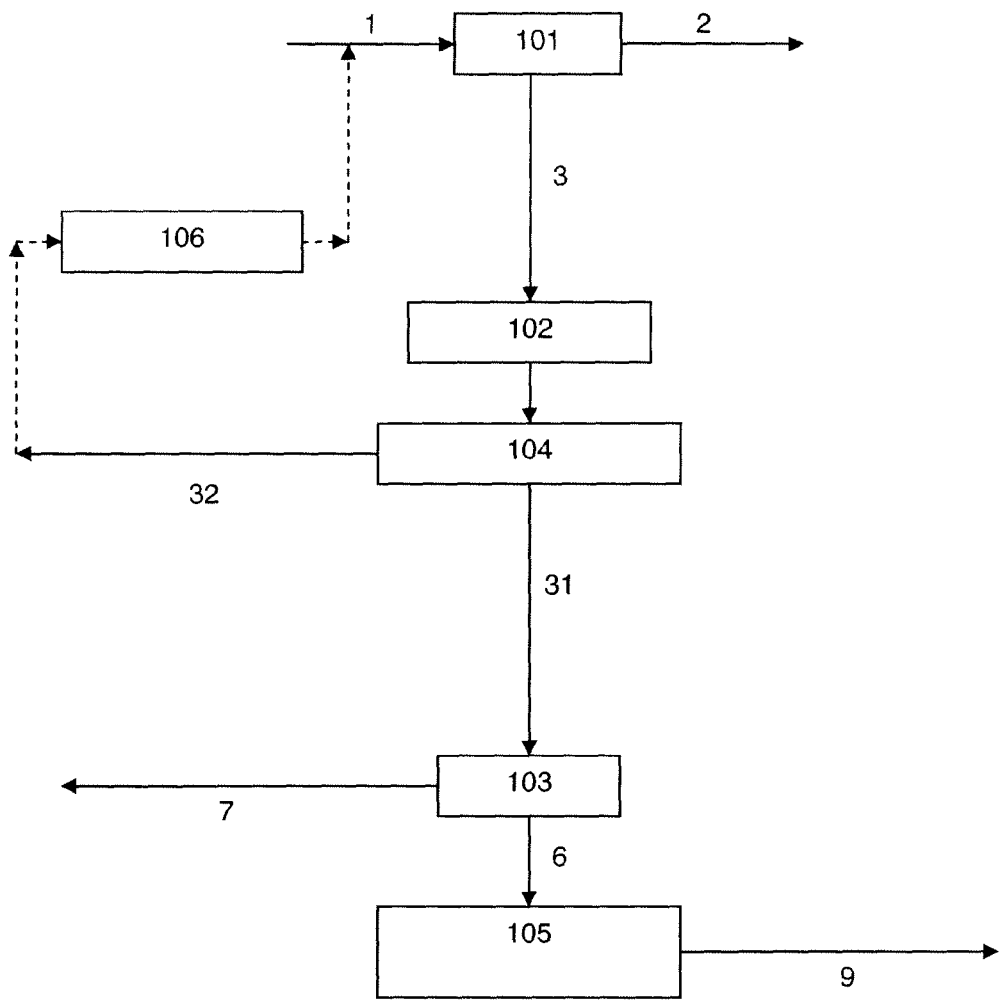
FIG. 6 is a flow sheet depicting a further embodiment of the present invention.

Referring to FIG. 6, a flow sheet depicting another embodiment of the invention is shown, in which the same reference numerals have again been used as in FIG. 1 to denote common features. In this embodiment, feed stream (1) is once more fed, at 6 MPa (60 bar) absolute, to $H_2$/CO-PSA system (101). The composition of the feed stream is again 1.0 mol % $H_2S$, 39.0 mol % $CO_2$ and 60.0 mol % of a mixture of $H_2$ and CO (figures rounded to the nearest 0.1 mol %). The $H_2$/CO-PSA system (101) separates the feed (1) into a $H_2$ and CO product stream (2) and a stream (3) enriched in $CO_2$ and $H_2S$. The $H_2$ and CO product stream (2) is produced at 6 MPa (60 bar) absolute, and is 6.1 mol % $CO_2$ and 93.9 mol % $H_2$ and CO. The $CO_2$ and $H_2S$ enriched stream (3) is produced at 0.1 MPa (1 bar) absolute, and is 2.2 mol % $H_2S$, 76.8 mol % $CO_2$, and 21.1 mol % $H_2$ and CO.

The $H_2$ and CO product stream (2) can, as discussed above, be sent for combustion and expansion of the resulting combustion effluent in a gas turbine (not shown) or used for chemicals production in a chemicals plant (not shown). The $CO_2$ and $H_2S$ enriched stream (3) is sent to a compressor (102) and compressed to 3.0 MPa (30 bar) absolute. The compressed $CO_2$ and $H_2S$ enriched stream (4) is then introduced into partial condensation system (104).

Partial condensation system (104) cools the compressed $CO_2$ and $H_2S$ enriched stream (4) to about −55° C. to partially condense the stream. The partially condensed stream is then separated, using one or more flash drums (phase separators) and/or distillation columns into a liquid further enriched in $CO_2$ and $H_2S$ and a vapour comprising $H_2S$, $CO_2$, $H_2$ and CO. Due to the vapour pressure of $H_2S$ and $CO_2$ at −55° C., the vapour is 0.6 mol % $H_2S$, 25.0 mol % $CO_2$ and 74.4 mol % $H_2$ and CO.

The vapour comprising $H_2S$, $CO_2$, $H_2$ and CO is withdrawn as gas stream (32), at 3 MPa (30 bar) absolute, and can again be used in a number of ways or simply disposed of, as discussed above. In the flow sheet depicted in FIG. 6, the gas stream is compressed in another compressor (106) and recycled to the $H_2$/CO-PSA system (101) by being added to the process feed (1) (as shown by the dashed line in FIG. 6).

The liquid condensate, which is 2.8 mol % $H_2S$, 96.3 mol % $CO_2$ and 0.9 mol % $H_2$ and CO, is vaporized and is withdrawn from the partial condensation system (104) as stream (31) at 3 MPa (30 bar) absolute. This stream is sent to sour-PSA system (103) where it is separated into an $H_2S$ enriched stream (7) and the $CO_2$ product stream (6). In the flow sheet depicted the further enriched in $CO_2$ and $H_2S$ stream (31) is not further compressed prior to being introduced into the $H_2$/CO-PSA system (101), but further compression could of course be provided if required.

The $H_2S$ enriched stream (7), produced at 0.1 MPa (1 bar) absolute by the sour-PSA system (103), is 50.0 mol % $H_2S$ and 50.0 mol % $CO_2$ and can again be sent to a sulphur recovery system (not shown) for conversion of the $H_2S$ into elemental sulphur. The $CO_2$ product stream (6), which is 99.0 mol % $CO_2$ and 1.0 mol % $H_2$ and CO, is withdrawn from the sour-PSA system (103) at 30 MPa (1 bar) and may be compressed in a further compressor (105) to a sufficient pressure, such as 12 MPa (120 bar) absolute, to be piped as a stream (9) to a geological storage site or used for EOR.

The $H_2$/CO-PSA system (101) and sour-PSA system (103) may again be operated using any of a variety of different PSA cycles, as will be well known to one of ordinary skill in the art. The sour-PSA system (103) may, for example, be operated via any of the cycles described above with reference to FIGS. 2 to 4.

It will be appreciated that the invention is not restricted to the details described above with reference to the preferred embodiments but that numerous modifications and variations can be made without departing form the spirit or scope of the invention as defined in the following claims.

The invention claimed is:

1. A method for separating a feed stream, comprising at least $H_2S$, CO and $H_2$, into at least a $CO_2$ product stream and an $H_2$ or $H_2$ and CO product stream (the "$H_2$/CO product stream"), wherein the feed stream is formed from a sour syngas stream obtained from gasification of a solid or liquid carbonaceous feedstock and is separated using a pressure swing adsorption system (the "$H_2$/CO-PSA system"), an $H_2S$ removal system, and a further separation system, and wherein:

the feed stream is introduced into either the $H_2$/CO-PSA system or the $H_2S$ removal system;

the $H_2$/CO-PSA system either separates the feed stream to provide the $H_2$/CO product stream and a stream enriched in $CO_2$ and $H_2S$, or separates a stream already depleted in $H_2S$ by the $H_2S$ removal system to provide the $H_2$/CO product stream and a stream enriched in $CO_2$ and depleted in $H_2S$;

the $H_2S$ removal system either processes the feed stream to provide a stream depleted in $H_2S$, or processes a stream already enriched in $CO_2$ and $H_2S$ by the $H_2$/CO-PSA system to provide a stream enriched in $CO_2$ and depleted in $H_2S$, or processes a stream already enriched in $CO_2$ and $H_2S$ by the $H_2$/CO-PSA system and further enriched in $CO_2$ and $H_2S$ by the further separation system to provide the $CO_2$ product stream; and the further separation system either separates a stream already enriched in $CO_2$ and $H_2S$ by the $H_2$/CO-PSA system to provide a stream further enriched in $CO_2$ and $H_2S$ and a stream comprising $H_2$ or $H_2$ and CO, or separates a stream already enriched in $CO_2$ by the $H_2$/CO-PSA system and depleted in $H_2S$ by the $H_2S$ removal system to provide the $CO_2$ product stream and a stream comprising $H_2$ or $H_2$ and CO.

2. The method of claim 1, wherein the $H_2S$ removal system separates the feed stream, or said stream already enriched in $CO_2$ and $H_2S$ by the $H_2$/CO-PSA system, or said stream already enriched in $CO_2$ and $H_2S$ by the $H_2$/CO-PSA system and further enriched in $CO_2$ and $H_2S$ by the further separation system, to provide an $H_2S$ enriched stream in addition to providing said stream depleted in $H_2S$, said stream enriched in $CO_2$ and depleted in $H_2S$, or said $CO_2$ product stream.

3. The method of claim 2, wherein the $H_2S$ removal system is another pressure swing adsorption system (the "sour-PSA system").

4. The method of claim 1, wherein the further separation system is a partial condensation system.

5. The method of claim 1, wherein the further separation system is a membrane separation system.

6. The method of claim 1, wherein the feed stream comprises from about 500 ppm to about 5 mole % $H_2S$, from about 10 to about 60 mole % $CO_2$, and from about 35 mole % to the remainder of $H_2$ or a mixture of $H_2$ and CO.

7. The method of claim 1, wherein at least about 80% of the $H_2$ present in the feed stream is recovered in the $H_2$/CO product stream and at most about 25% of the $CO_2$ present in the feed stream is recovered the $H_2$/CO product stream, and wherein the $H_2$/CO product stream contains at most about 50 ppm $H_2S$.

8. The method of claim 1, wherein at least about 75% of the $H_2$ and CO present in the feed stream is recovered the $H_2$/CO product stream and at most about 25% of the $CO_2$ present in the feed stream is recovered the $H_2$/CO product stream, and wherein the $H_2$/CO product stream contains at most about 50 ppm $H_2S$.

9. The method of claim 1, wherein the $CO_2$ product stream has a $CO_2$ concentration of at least about 90 mole % and contains at most about 100 ppm $H_2S$.

10. The method of claim 2, wherein the $H_2S$ enriched stream has a $H_2S$ concentration of from about 20 to about 80 mol %.

11. The method of claim 1, wherein some or all of the stream comprising $H_2$ or $H_2$ and CO obtained from the further separation system is recycled to the $H_2$/CO-PSA system for further separation.

12. The method of claim 1, wherein some or all of the stream comprising $H_2$ or $H_2$ and CO obtained from the further separation system is combusted to generate power.

13. The method of claim 1, wherein some or all of the stream comprising $H_2$ or $H_2$ and CO obtained from the further separation system is combusted in the presence of sufficient $O_2$ to convert all or substantially all of the $H_2$ and CO in the part of the stream combusted to $H_2O$ and $CO_2$.

14. The method of claim 3, wherein steam is used as a purge gas for purging the sour-PSA.

15. The method of claim 3, wherein some or all of the stream comprising $H_2$ or $H_2$ and CO obtained from the further separation system is used as a purge gas for purging the sour-PSA.

16. The method of claim 1, wherein:
the feed stream is introduced into the $H_2$/CO-PSA system;
the $H_2$/CO-PSA system separates the feed stream to provide the $H_2$/CO product stream and a stream enriched in $CO_2$ and $H_2S$;
the $H_2S$ removal system processes said stream enriched in $CO_2$ and $H_2S$ to provide a stream enriched in $CO_2$ and depleted in $H_2S$; and
the further separation system separates said stream enriched in $CO_2$ and depleted in $H_2S$ to provide the $CO_2$ product stream and a stream comprising $H_2$ or $H_2$ and CO.

17. The method of claim 16, wherein feed stream further comprises water, and the $H_2S$ removal system processes said stream enriched in $CO_2$ and $H_2S$ to provide a stream enriched in $CO_2$ and depleted in $H_2S$ and water.

18. The method of claim 1, wherein:
the feed stream is introduced into the $H_2S$ removal system;
the $H_2S$ removal system processes the feed stream to provide a stream depleted in $H_2S$;
the $H_2$/CO-PSA system separates said stream depleted in $H_2S$ to provide the $H_2$/CO product stream and a stream enriched in $CO_2$ and depleted in $H_2S$; and
the further separation system separates said stream enriched in $CO_2$ and depleted in $H_2S$ to provide the $CO_2$ product stream and a stream comprising $H_2$ or $H_2$ and CO.

19. The method of claim 18, wherein feed stream further comprises water, and the $H_2S$ removal system processes the feed stream to provide a stream depleted in $H_2S$ and water.

20. The method of claim 1, wherein:
the feed stream is introduced into the $H_2$/CO-PSA system;
the $H_2$/CO-PSA system separates the feed stream to provide the $H_2$/CO product stream and a stream enriched in $CO_2$ and $H_2S$;
the further separation system separates said stream enriched in $CO_2$ and $H_2S$ to provide a stream further enriched in $CO_2$ and $H_2S$ and a stream comprising $H_2$ or $H_2$ and CO;
the $H_2S$ removal system processes said stream further enriched in $CO_2$ and $H_2S$ to provide the $CO_2$ product stream.

21. Apparatus for separating a feed stream, formed from a sour syngas stream obtained from gasification of a solid or liquid carbonaceous feedstock and comprising at least $H_2S$, $CO_2$ and $H_2$, into at least a $CO_2$ product stream and an $H_2$ or $H_2$ and CO product stream (the "$H_2$/CO product stream"), the apparatus comprising:
a pressure swing adsorption system (the "$H_2$/CO-PSA system") for separating the feed stream to provide the $H_2$/CO product stream and a stream enriched in $CO_2$ and $H_2S$;
a conduit arrangement for introducing the feed stream into the $H_2$/CO-PSA system;
a conduit arrangement for withdrawing the $H_2$/CO product stream from the $H_2$/CO-PSA system;
an $H_2S$ removal system, for processing said stream enriched in $CO_2$ and $H_2S$ to provide a stream enriched in $CO_2$ and depleted in $H_2S$;
a conduit arrangement for withdrawing the stream enriched in $CO_2$ and $H_2S$ from the $H_2$/CO-PSA system and introducing the stream into the $H_2S$ removal system;
a further separation system, for separating said stream enriched in $CO_2$ and depleted in $H_2S$ to provide the $CO_2$ product stream and a stream comprising $H_2$ or $H_2$ and CO;
a conduit arrangement for withdrawing the stream enriched in $CO_2$ and depleted in $H_2S$ from the $H_2S$ removal system and introducing the stream into the further separation system;
a conduit arrangement for withdrawing the $CO_2$ product stream from the further separation system; and
a conduit arrangement for withdrawing the stream comprising $H_2$ or $H_2$ and CO from the further separation system.

22. Apparatus for separating a feed stream, formed from a sour syngas stream obtained from gasification of a solid or liquid carbonaceous feedstock and comprising at least $H_2S$, $CO_2$ and $H_2$, into at least a $CO_2$ product stream and an $H_2$ or $H_2$ and CO product stream (the "$H_2$/CO product stream"), the apparatus comprising:
an $H_2S$ removal system, for processing the feed stream to provide a stream depleted in $H_2S$;
a conduit arrangement for introducing the feed stream into the $H_2S$ removal system;
a pressure swing adsorption system (the "$H_2$/CO-PSA system") for separating said stream depleted in $H_2S$ to provide the $H_2$/CO product stream and a stream enriched in $CO_2$ and depleted in $H_2S$;
a conduit arrangement for withdrawing the stream depleted in $H_2S$ from the $H_2S$ removal system and introducing the stream into the $H_2$/CO-PSA system;
a conduit arrangement for withdrawing the $H_2$/CO product stream from the $H_2$/CO-PSA system;
a further separation system, for separating said stream enriched in $CO_2$ and depleted in $H_2S$ to provide the $CO_2$ product stream and a stream comprising $H_2$ or $H_2$ and CO;
a conduit arrangement for withdrawing the stream enriched in $CO_2$ and depleted in $H_2S$ from the $H_2$/CO-PSA system and introducing the stream into the further separation system;
a conduit arrangement for withdrawing the $CO_2$ product stream from the further separation system; and
a conduit arrangement for withdrawing the stream comprising $H_2$ or $H_2$ and CO from the further separation system.

23. Apparatus for separating a feed stream, formed from a sour syngas stream obtained from gasification of a solid or liquid carbonaceous feedstock and comprising at least $H_2S$, $CO_2$ and $H_2$, into at least a $CO_2$ product stream and an $H_2$ or $H_2$ and CO product stream (the "$H_2$/CO product stream"), the apparatus comprising:
a pressure swing adsorption system (the "$H_2$/CO-PSA system") for separating the feed stream to provide the $H_2$/CO product stream and a stream enriched in $CO_2$ and $H_2S$;
a conduit arrangement for introducing the feed stream into the $H_2$/CO-PSA system;
a conduit arrangement for withdrawing the $H_2$/CO product stream from the $H_2$/CO-PSA system;

a further separation system, for separating said stream enriched in $CO_2$ and $H_2S$ to provide a stream further enriched in $CO_2$ and $H_2S$ and a stream comprising $H_2$ or $H_2$ and CO;
a conduit arrangement for withdrawing the stream enriched in $CO_2$ and $H_2S$ from the $H_2$/CO-PSA system and introducing the stream into the further separation system;
a conduit arrangement for withdrawing the stream comprising $H_2$ or $H_2$ and CO from the further separation system;

an $H_2S$ removal system, for processing said stream further enriched in $CO_2$ and $H_2S$ to provide the $CO_2$ product stream;
a conduit arrangement for withdrawing the stream further enriched in $CO_2$ and $H_2S$ from the further separation system and introducing the stream into the $H_2S$ removal system; and
a conduit arrangement for withdrawing the $CO_2$ product stream from the $H_2S$ removal system.

* * * * *